US012680863B2

(12) United States Patent
Downey

(10) Patent No.: US 12,680,863 B2
(45) Date of Patent: Jul. 14, 2026

(54) ACOUSTIC MEASUREMENT APPARATUS, KIT, AND METHOD OF USE THEREOF

(71) Applicant: Pliteq Inc., Toronto (CA)

(72) Inventor: Paul Charles Downey, Toronto (CA)

(73) Assignee: Pliteq Inc., Toronto (CA)

( * ) Notice: Subject to any disclaimer, the term of this patent is extended or adjusted under 35 U.S.C. 154(b) by 377 days.

(21) Appl. No.: 18/409,880

(22) Filed: Jan. 11, 2024

(65) Prior Publication Data

US 2024/0142299 A1 May 2, 2024

Related U.S. Application Data

(63) Continuation-in-part of application No. 17/555,942, filed on Dec. 20, 2021, now Pat. No. 11,906,467.

(51) Int. Cl.
*G01H 7/00* (2006.01)

(52) U.S. Cl.
CPC ...................................... *G01H 7/00* (2013.01)

(58) Field of Classification Search
CPC ............ G01M 7/08; G01N 2203/0658; G01N 2291/023; G01N 2291/028; G01N 29/045–046; G01N 3/303; G01N 2291/01; B32B 2471/04; E04F 15/20; E04F 15/203; E04F 15/206; E04F 2290/041; E04F 2290/042; E04F 2290/043; F16F 1/3737; G01H 3/10; G01H 7/00
See application file for complete search history.

(56) References Cited

U.S. PATENT DOCUMENTS

| | | | |
|---|---|---|---|
| 3,266,289 | A | 8/1966 | Stamy |
| 3,859,841 | A | 1/1975 | Evans |
| 8,327,709 | B2 | 12/2012 | Daraio |

(Continued)

FOREIGN PATENT DOCUMENTS

| | | |
|---|---|---|
| CN | 106124153 A | 11/2016 |
| CN | 106289961 A | 1/2017 |

(Continued)

OTHER PUBLICATIONS

USPTO; Office Action relating to U.S. Appl. No. 17/555,942 dated Feb. 15, 2023.

(Continued)

*Primary Examiner* — David L Singer
(74) *Attorney, Agent, or Firm* — Rowand LLP

(57) ABSTRACT

Systems and methods are provided for selecting a preferred type of acoustic insulation apparatus in connection with a particular site. An isolation acoustic measurement corresponding to a reference type of acoustic insulation apparatus and a plurality of difference measurements may be determined. An on-site acoustic measurement corresponding to the reference type of acoustic insulation apparatus may be received. A predicted secondary on-site acoustic measurement may be determined for each distinct secondary type of acoustic insulation apparatus. An on-site ambient noise measurement may be received. The type of acoustic insulation apparatus being associated with the on-site acoustic measurement having the closest value to the on-site ambient noise measurement may be selected as the preferred type of acoustic insulation apparatus in connection with the particular site.

20 Claims, 15 Drawing Sheets

(56) References Cited

U.S. PATENT DOCUMENTS

| | | | |
|---|---|---|---|
| 10,527,531 B2 | 1/2020 | Peddle | |
| 10,880,663 B1 * | 12/2020 | Woodall | H04R 29/00 |
| 2010/0024519 A1 | 2/2010 | Zhang | |
| 2012/0006125 A1 | 1/2012 | Wen | |
| 2013/0226737 A1 * | 8/2013 | Milostic | G06Q 30/0631 |
| | | | 705/26.63 |
| 2016/0375296 A1 | 12/2016 | Downey | |
| 2019/0073370 A1 * | 3/2019 | Woodall | G06F 16/164 |
| 2022/0163375 A1 * | 5/2022 | Arni | G06T 11/00 |

FOREIGN PATENT DOCUMENTS

| | | | | |
|---|---|---|---|---|
| CN | 106324097 A | | 1/2017 | |
| CN | 206095565 U | | 4/2017 | |
| CN | 206192771 U | | 5/2017 | |
| CN | 107356324 A | | 11/2017 | |
| CN | 109085243 A | | 12/2018 | |
| CN | 111060597 A | | 4/2020 | |
| CN | 112505158 A | * | 3/2021 | G01N 29/11 |
| JP | H0996598 A | | 4/1997 | |
| JP | H11142309 A | | 5/1999 | |
| JP | 2001074594 A | | 3/2001 | |
| JP | 4062385 B2 | | 3/2008 | |
| JP | 2008224632 A | | 9/2008 | |
| KR | 20050082056 A | | 8/2005 | |
| KR | 100931891 B1 | | 12/2009 | |
| KR | 101773703 B1 | | 8/2017 | |
| KR | 101979112 B1 | | 5/2019 | |
| KR | 102143488 B1 | | 8/2020 | |
| KR | 102245046 B1 | * | 4/2021 | G06Q 10/04 |
| KR | 102245047 B1 | | 4/2021 | |

OTHER PUBLICATIONS

Straub, Screen captures from YouTube video clip entitled "Ball Drop Tube", 7 pages, uploaded on Dec. 2, 2014 by user "Cool Science". Retrieved from Internet: <https://www.youtube.com/watch?v=zG3a1vZ11Rg&t=2s>. (Year: 2014).

Zhang, Thesis Measuring Acoustic Attenuation of Polymer Materials Using Drop Ball Test, Embry Riddle Aeronautical University, 2013 (Year 2013).

HGC Engineering, Ear to the Ground What is STC and IIC Testing? Oct. 2021 (Year: 2021).

USPTO; Office Action relating to U.S. Appl. No. 17/555,942 dated Jun. 30, 2023.

Aplicaciones Mecanicas del Caucho, Acoustic Isolator Pro: the App to Measure and Isolate Noise From Industrial Machinery, Mar. 17, 2021 (Year: 2021).

* cited by examiner

I

100

108

106     110

104

102

112

SECTION I - I

100

108     114

106

104     110

102

112

500

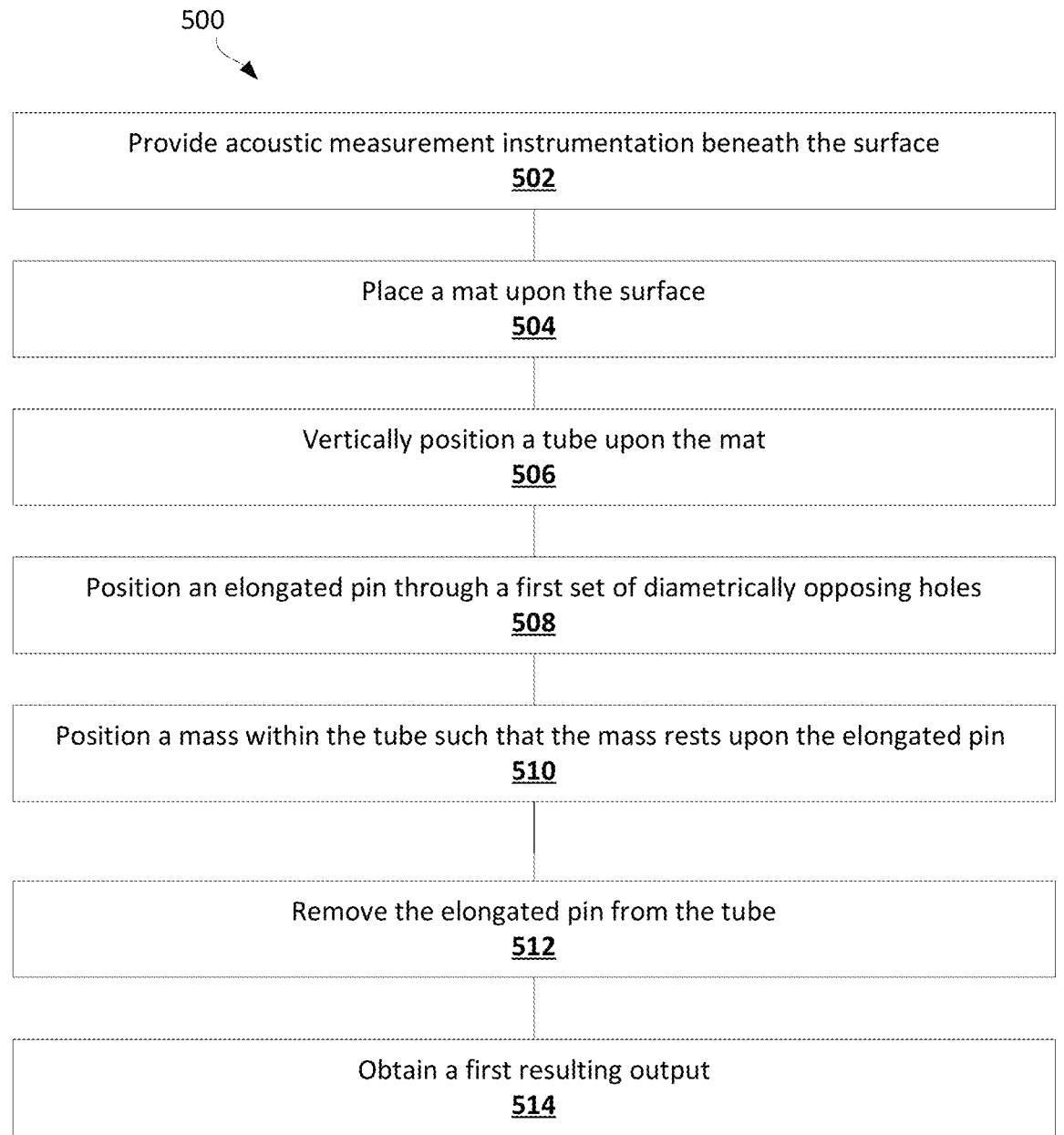

Provide acoustic measurement instrumentation beneath the surface
502

Place a mat upon the surface
504

Vertically position a tube upon the mat
506

Position an elongated pin through a first set of diametrically opposing holes
508

Position a mass within the tube such that the mass rests upon the elongated pin
510

Remove the elongated pin from the tube
512

Obtain a first resulting output
514

FIG. 5

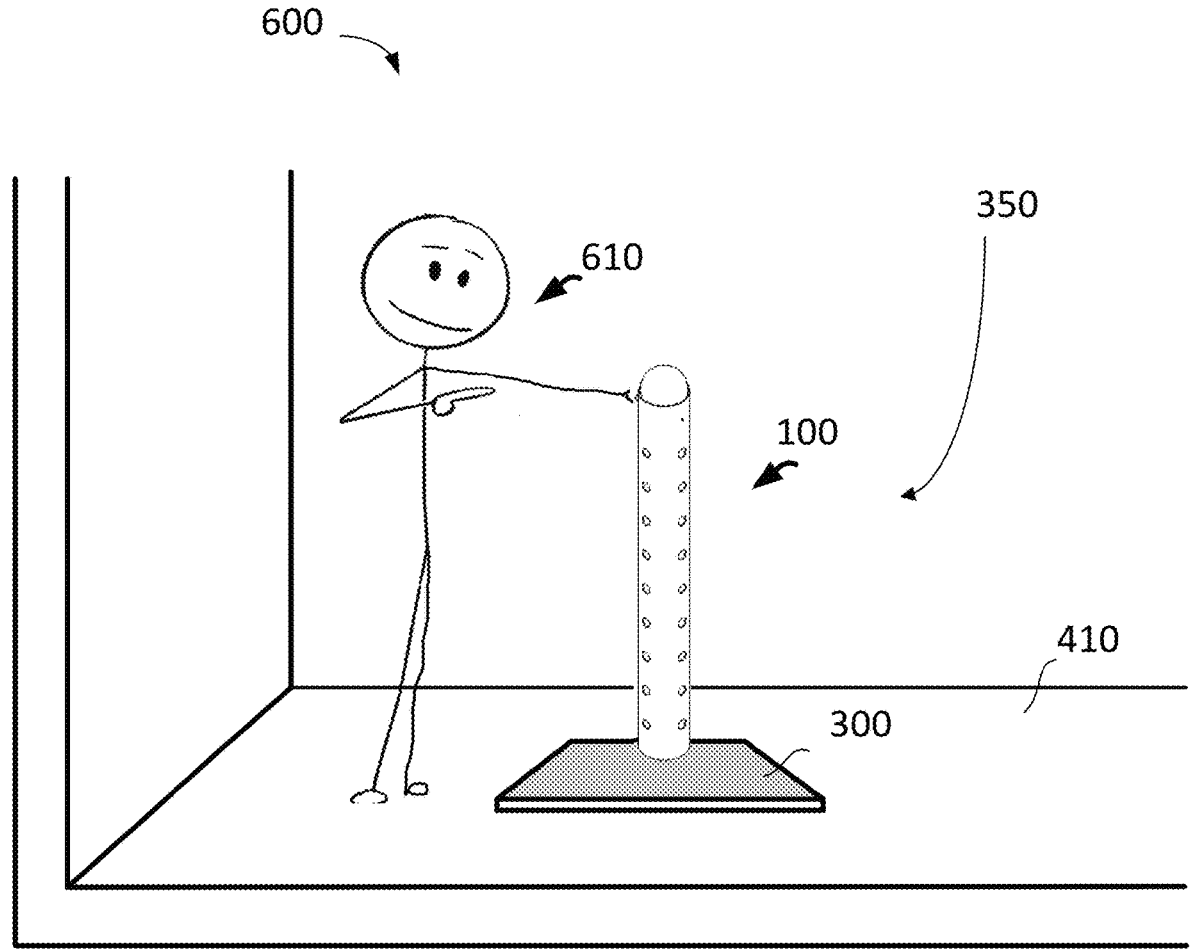
FIG. 6

700

810

902

1200

Receive at least one output from
acoustic measurement
instrumentation
1202

Calculate an average output of
the at least one output
1204

Analyze the average output
1206

Identify a first grouping of one or
more sets of specifications
1208

Generate a user interface
including a listing of one or more
particular acoustic insulation
apparatuses
1210

Present the user interface
1212

1400

1404

1402

1408

1410

1406

300

1700

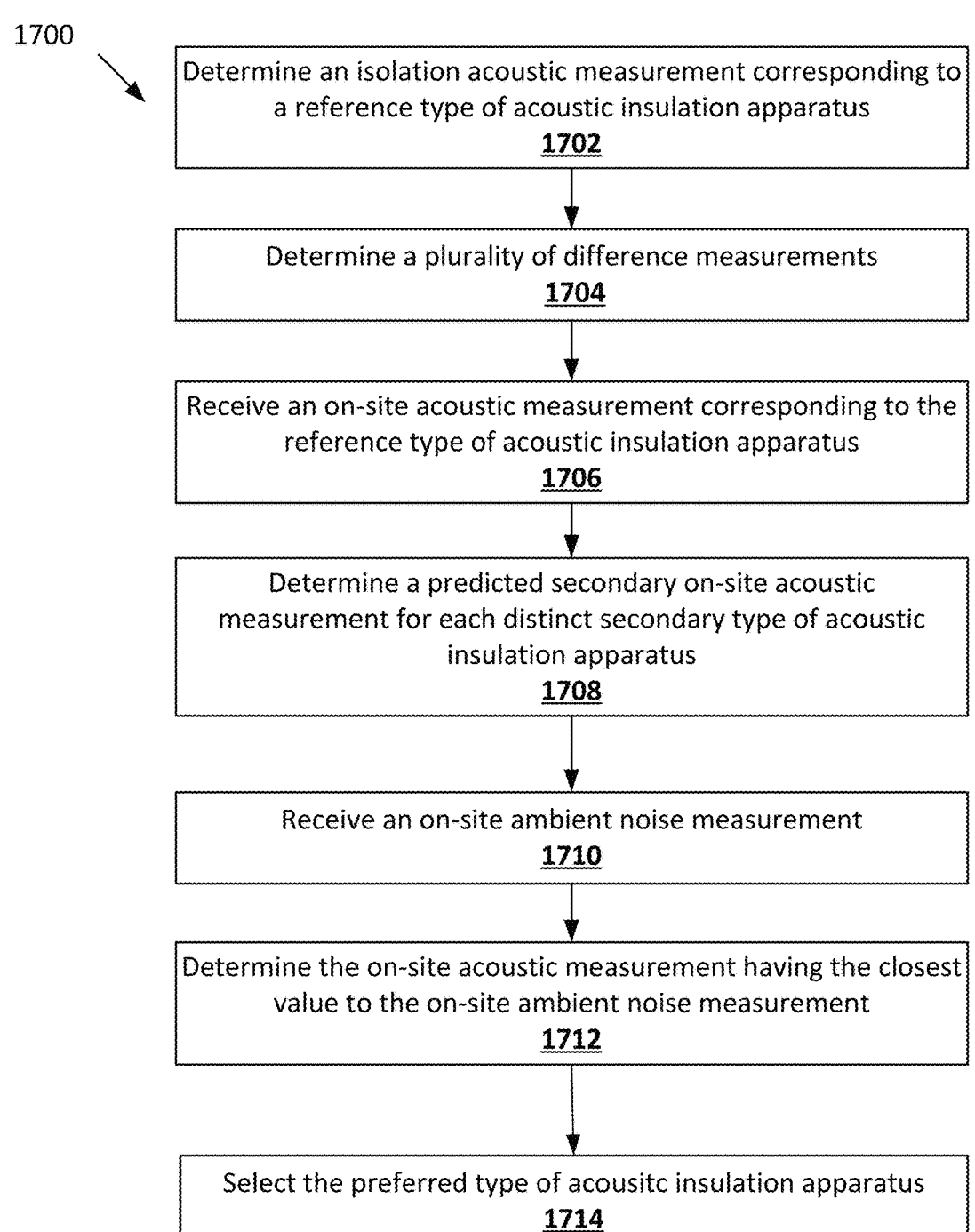

Determine an isolation acoustic measurement corresponding to a reference type of acoustic insulation apparatus
1702

Determine a plurality of difference measurements
1704

Receive an on-site acoustic measurement corresponding to the reference type of acoustic insulation apparatus
1706

Determine a predicted secondary on-site acoustic measurement for each distinct secondary type of acoustic insulation apparatus
1708

Receive an on-site ambient noise measurement
1710

Determine the on-site acoustic measurement having the closest value to the on-site ambient noise measurement
1712

Select the preferred type of acousitc insulation apparatus
1714

FIG. 17

ACOUSTIC MEASUREMENT APPARATUS, KIT, AND METHOD OF USE THEREOF

TECHNICAL FIELD

The present application relates to acoustic insulation testing, and, more particularly, to methods and apparatuses for performing acoustic insulation testing and for providing recommendations based on the testing.

BACKGROUND

Noise continues to be a health hazard in many workplaces, homes, and meeting areas. Surfaces such as the windows, doors, and walls of a building need to diminish the transfer of unwanted sound into nearby areas. Acoustical testing helps determine levels of sound transmission through these surfaces.

One method for performing sound insulation testing involves providing acoustic measurement instrumentation to a surface and subsequently dropping an object from a certain height onto that surface. One of the challenges of this method of testing is reproducibility, as the height from which the object is dropped may not be consistent between tests. Another challenge of this method of testing is the portability of all testing components.

When performed by a layperson, there exists a further challenge of interpreting the test results in order to select appropriate acoustic insulation apparatuses based on the test results. Improvements to the field are desired.

DESCRIPTION OF THE DRAWINGS

Embodiments are described in detail below, with reference to the following drawings:

FIG. 5 is a flowchart of a method of measuring acoustic properties of a surface, in accordance with an embodiment of the present application;

FIG. 6 illustrates an example embodiment of a user performing an example method, in accordance with an embodiment of the present application;

FIG. 17 is a flowchart depicting example operations performed in a method of selecting a preferred type of acoustic insulation apparatus in connection with a particular site, in accordance with examples, described herein.

Like reference numerals are used in the drawings to denote like elements and features.

DETAILED DESCRIPTION OF VARIOUS EMBODIMENTS

Figure 1A:
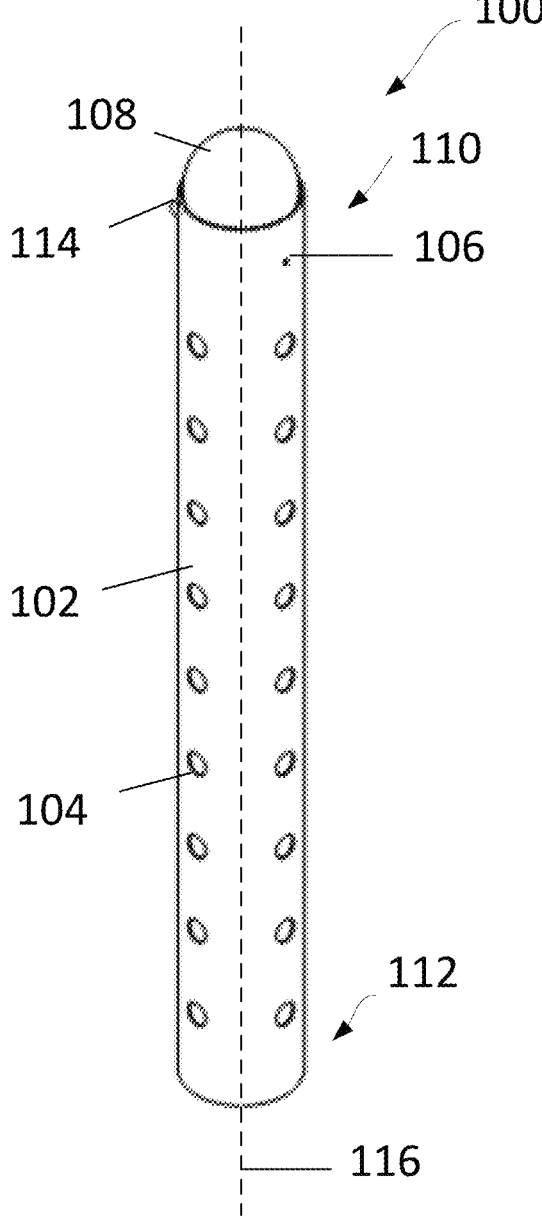
FIG. 1A a front view of an example apparatus, in accordance with an embodiment of the present application.

In accordance with one embodiment of the present application, there may be provided a kit for measuring acoustic properties of a surface. The kit may comprise an elongated pin; a tube having first and second ends, the tube having at least one pair of diametrically opposing holes, the at least one pair of diametrically opposing holes operable to support the elongated pin therethrough; and a mass adapted to be received through the first and second ends of the tube. Placement of the elongated pin through a first pair of the at least one pair of diametrically opposing holes may prevent movement of the mass through the tube, and removal of the elongated pin through the first pair of the at least one pair of diametrically opposing holes allows passage of the mass through the tube.

In one aspect, the kit may further comprise a mat for placement on the surface beneath the tube for receiving the mass.

In another aspect, the mat may be made of an elastomer and may have a generally planar upper facing.

In yet another aspect, removal of the elongated pin through the first pair of the at least one pair of diametrically opposing holes may allow passage of the mass through the tube and onto the mat.

In still yet another aspect, the mass may be a sphere.

In still yet another aspect, a diameter of an interior of the tube may be larger than a width of the mass. In this way, a gap may be provided between the interior of the tube and the mass when the mass passes through the tube.

In still yet another aspect, the gap may have a width of at least 6 millimeters.

In still yet another aspect, the tube may have more than one pair of diametrically opposing holes to allow the elongated pin to be placed at different heights.

In still yet another aspect, the mass may be constructed of a non-deformable material.

In still yet another aspect, the mass may be constructed of steel.

In still yet another aspect, the kit may have a weight that does not exceed 30 kilograms.

In accordance with one embodiment of the present application, there may be provided a method for measuring acoustic properties of a surface. The method may comprise the steps of: a) providing acoustic measurement instrumentation beneath the surface; b) placing a mat upon the surface; c) positioning a tube upon the mat, a length of the tube being perpendicular to the surface, the tube having at least one pair of diametrically opposing holes; d) positioning an elongated pin through a first pair of the at least one pair of diametrically opposing holes; e) positioning a mass within the tube such that the mass rests upon the elongated pin; f) removing the elongated pin from the tube such that the mass falls through a bottom portion of the tube onto the surface thereby providing input to the acoustic measurement instrumentation; and g) obtaining a first resulting output by the acoustic measurement instrumentation.

In one aspect, the method may further comprise the steps of: repeating steps c) through f); obtaining a second resulting output by the acoustic measurement instrumentation; and determining an average resulting output by averaging the first resulting output and the second resulting output.

In another aspect, the method may further comprise: repeating steps c) through f); obtaining a second resulting output by the acoustic measurement instrumentation; repeating steps c) through f); obtaining a third resulting output by the acoustic measurement instrumentation; and determining an average resulting output by averaging the first resulting output, the second resulting output and the third resulting output.

In yet another aspect, the surface may be a slab floor.

In still yet another aspect, the mat may be formed of an elastomer and may have a generally planar upper facing.

In still yet another aspect, the tube may have more than one pair of diametrically opposing holes which may allow the elongated pin to be placed at different heights.

In still yet another aspect, the mass may be a sphere.

In still yet another aspect, the tube, the elongated pin, the mass, and the mat may have a combined weight that does not exceed 30 kilograms.

In accordance with one embodiment of the present application, there is provided a tube for measuring acoustic properties of a surface. The tube may comprise first and second ends and at least one pair of diametrically opposing holes. The at least one pair of diametrically opposing holes may be operable to support an elongated pin therethrough. Placement of the elongated pin through a first pair of the at least one pair of diametrically opposing holes may prevent movement of a mass through the tube. Removal of the elongated pin through the first pair of the at least one pair of diametrically opposing holes may allow passage of the mass through the tube.

In another aspect, a diameter of an interior of the tube may be larger than a width of the mass which may provide a gap between the interior of the tube and the mass when the mass passes through the tube.

In yet another aspect, the tube may have more than one pair of diametrically opposing holes which may allow the elongated pin to be placed at different heights.

In still yet another aspect, the tube may have a weight that does not exceed 5 kilograms.

In still yet another aspect, a diameter of the interior of the tube may not exceed 15 centimeters.

In still yet another aspect, a length of the tube may not exceed 120 centimeters.

In still yet another aspect, the mass may be a sphere.

In accordance with one embodiment of the present application, there may be provided a non-transitory computer readable medium comprising processor-executable instructions which, when executed, may configure a processor to: receive at least one output from acoustic measurement instrumentation, the at least one output representing an effect of a mass being dropped through a tube onto a floor after pulling a pin; calculate an average output of the at least one output; analyze the average output, including comparing the output to one or more sets of specifications, each of the one or more sets of specifications corresponding to one or more particular acoustic insulation apparatuses; identify a first grouping of the one or more sets of specifications, each of the one or more sets of specifications within the first grouping corresponding to the average output; generate a user interface including a listing of the one or more particular acoustic insulation apparatuses associated with the one or more sets of specifications of the first grouping; and present the user interface, the user interface including a listing of the one or more particular acoustic insulation apparatuses associated with the one or more sets of specifications of the first grouping.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; the placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, a diameter of an interior of the tube may be larger than a width of the mass providing a gap between the interior of the tube and the mass when the mass passes through the tube.

In still yet another aspect, the tube may have more than one pair of diametrically opposing holes to allow the elongated pin to be placed at different heights.

In accordance with one embodiment of the present application, there may be provided a computer system comprising: a processor; a communications module coupled to the processor; an input module coupled to the processor; an output module coupled to the processor; and a memory coupled to the processor and storing instructions that, when executed by the processor, may cause the computer system to: receive, using the communications module, from acoustic measurement instrumentation via a computer network, at least one output from the acoustic measurement instrumentation, the at least one output representing an effect of a mass being dropped through a tube onto a floor after pulling a pin; calculate an average output of the at least one outputs; analyze the average output, including comparing the average output to one or more sets of specifications, each of the one or more sets of specifications corresponding to one or more particular acoustic insulation apparatuses; identify a first grouping of the one or more sets of specifications, each of the one or more sets of specifications with the first grouping corresponding to the average output; generate a user interface including a listing of the one or more particular acoustic insulation apparatuses associated with the one or more sets of specifications of the first grouping; and present, using the output module, the user interface including a listing of the one or more particular acoustic insulation apparatuses associated with the one or more sets of specifications of the first grouping.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; the placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, a diameter of an interior of the tube may be larger than a width of the mass providing a gap between the interior of the tube and the mass when the mass passes through the tube.

In still yet another aspect, the tube may have more than one pair of diametrically opposing holes to allow the elongated pin to be placed at different heights.

In accordance with one embodiment of the present application, there may be provided a computer-implemented method for identifying one or more acoustic insulators, the computer-implemented method comprising: providing acoustic measurement instrumentation beneath a floor; positioning a tube upon the floor, a length of the tube being perpendicular to the floor, the tube having at least one pair of diametrically opposing holes; positioning an elongated pin through a first pair of the at least one pair of diametrically opposing holes; positioning a mass within the tube such that the mass rests upon the elongated pin; removing the elongated pin from the tube such that the mass falls through a bottom portion of the tube onto the floor thereby providing input to the acoustic measurement instrumentation; uploading, to a computer system, a resulting output by the acoustic measurement instrumentation; and receiving, from the computer system, a listing including at least one acoustic insulation apparatuses.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, the tube may have more than one pair of diametrically opposing holes to allow the elongated pin to be placed at different heights.

In accordance with examples of the present application, there is provided a computer system for selecting a preferred type of acoustic insulation apparatus in connection with a particular site, the computer system comprising a processor and a memory coupled to the processor. The memory stores instructions which, when executed by the processor, cause the computer system to determine an isolation acoustic measurement corresponding to a reference type of acoustic insulation apparatus; determine a plurality of difference measurements, each of the plurality of difference measurements being associated with a distinct secondary type of acoustic insulation apparatus; receive an on-site acoustic measurement corresponding to the reference type of acoustic insulation apparatus; for each distinct secondary type of acoustic insulation apparatus: determine a predicted secondary on-site acoustic measurement by adjusting the on-site acoustic measurement by the difference measurement associated with the distinct secondary type of acoustic insulation apparatus; receive an on-site ambient noise measurement; determine the on-site acoustic measurement having the closest value to the on-site ambient noise measurement; and select, as the preferred type of acoustic insulation apparatus, a type of acoustic insulation apparatus being associated with the on-site acoustic measurement having the closest value to the on-site ambient noise measurement.

In some implementations, the computer system is further caused to provide user interface data causing a display of a user interface that includes an identification of the preferred type of acoustic insulation apparatus.

In some implementations, determining the plurality of difference measurements comprises determining a plurality of secondary isolation acoustic measurements, each of the plurality of secondary isolation acoustic measurements corresponding to one of the distinct secondary types of acoustic insulation apparatuses; and determining the plurality of difference measurements by comparing the isolation acoustic measurement to each of the plurality of secondary isolation acoustic measurements.

In some implementations, the isolation acoustic measurement is a frequency domain force pulse signature, and the frequency domain force pulse signature is determined by receiving force pulse data corresponding to the reference type of acoustic insulation apparatus in isolation; obtaining a time domain force pulse signature using the force pulse data; and converting the time domain force pulse signature to a frequency domain force pulse signature.

In some implementations, the secondary isolation acoustic measurements are frequency domain force pulse signatures, and the frequency domain force pulse signatures are determined by receiving force pulse data corresponding to each of the distinct secondary types of acoustic insulation apparatuses in isolation; obtaining time domain force pulse signatures using the force pulse data; and converting each of the time domain force pulse signature to a frequency domain force pulse signature.

In some implementations, the force pulse data is obtained from a force gauge oriented to measure a force pulse of a mat upon impact by a mass.

In some implementations, determining the isolation acoustic measurement comprises receiving a mat identifier associated with a reference mat, the reference mat comprising the reference type of acoustic insulation apparatus; associating the mat identifier with a first stored acoustic measurement; and determining the isolation acoustic measurement to be the first stored acoustic measurement.

In some implementations, the on-site acoustic measurement corresponding to the reference type of acoustic insulation apparatus has been obtained using the reference mat at the particular site.

In some implementations, determining the isolation acoustic measurement corresponding to the reference type of acoustic insulation apparatus comprises retrieving, from the memory, the isolation acoustic measurement.

In some implementations, determining the plurality of secondary isolation acoustic measurements comprises retrieving, from the memory, the isolation acoustic measurement.

In accordance with examples of the present application, there is provided a computer-implemented method for selecting a preferred type of acoustic insulation apparatus in connection with a particular site. The method comprises determining an isolation acoustic measurement corresponding to a reference type of acoustic insulation apparatus; determining a plurality of difference measurements, each of the plurality of difference measurements being associated with a distinct secondary type of acoustic insulation apparatus; receiving an on-site acoustic measurement corresponding to the reference type of acoustic insulation apparatus; for each distinct secondary type of acoustic insulation apparatus: determining a predicted secondary on-site acoustic measurement by adjusting the on-site acoustic measurement by the difference measurement associated with the distinct secondary type of acoustic insulation apparatus; receiving an on-site ambient noise measurement; determining the on-site acoustic measurement having the closest value to the on-site ambient noise measurement; and selecting, as the preferred type of acoustic insulation apparatus, a type of acoustic insulation apparatus being associated with the on-site acoustic measurement having the closest value to the on-site ambient noise measurement.

In some implementations, the method further comprises providing user interface data causing a display of a user interface that includes an identification of the preferred type of acoustic insulation apparatus.

In some implementations, determining the plurality of difference measurements comprises receiving a plurality of secondary isolation acoustic measurements, each of the plurality of secondary isolation acoustic measurements corresponding to one of the distinct secondary types of acoustic insulation apparatuses; and determining the plurality of difference measurements by comparing the isolation acoustic measurement to each of the plurality of secondary isolation acoustic measurements.

In some implementations, the isolation acoustic measurement is a frequency domain force pulse signature, and the frequency domain force pulse signature is determined by receiving force pulse data corresponding to the reference type of acoustic insulation apparatus in isolation; obtaining a time domain force pulse signature using the force pulse data; and converting the time domain force pulse signature to a frequency domain force pulse signature.

In some implementations, the secondary isolation acoustic measurements are frequency domain force pulse signatures, and the frequency domain force pulse signatures are determined by receiving force pulse data corresponding to each of the distinct secondary types of acoustic insulation apparatuses in isolation; obtaining time domain force pulse signatures using the force pulse data; and converting each of the time domain force pulse signature to a frequency domain force pulse signature.

In some implementations, the force pulse data is obtained from a force gauge oriented to measure a force pulse of a mat upon impact by a mass.

In some implementations, determining the isolation acoustic measurement comprises receiving a mat identifier associated with a reference mat; associating the mat identifier with a first stored acoustic measurement; and determining the isolation acoustic measurement to be the first stored acoustic measurement.

In some implementations, the on-site acoustic measurement corresponding to the reference type of acoustic insulation apparatus been obtained using the reference mat in the particular site.

In some implementations, determining the isolation acoustic measurement corresponding to the reference type of acoustic insulation apparatus comprises retrieving, from a memory, the isolation acoustic measurement.

In accordance with some examples of the present application, there is provided a non-transitory computer-readable storage medium. The non-transitory computer-readable storage medium contains instructions which, when executed by a processor, cause the processor to determine an isolation acoustic measurement corresponding to a reference type of acoustic insulation apparatus; determine a plurality of difference measurements, each of the plurality of difference measurements being associated with a distinct secondary type of acoustic insulation apparatus; receive an on-site acoustic measurement corresponding to the reference type of acoustic insulation apparatus; for each distinct secondary type of acoustic insulation apparatus: determine a predicted secondary on-site acoustic measurement by adjusting the on-site acoustic measurement by the difference measurement associated with the distinct secondary type of acoustic insulation apparatus; receive an on-site ambient noise measurement; determine the predicted secondary on-site acoustic measurement having the closest value to the on-site ambient noise measurement; and select, as a preferred type of acoustic insulation apparatus, the distinct secondary type of acoustic insulation apparatus being associated with the predicted secondary on-site acoustic measurement having the closest value to the on-site ambient noise measurement.

Reference will first be made to FIG. 1A, which is a front view of an example apparatus 100. The example apparatus 100 includes a tube 102, an elongated pin 106 and a mass 108. The tube 102 may be cylindrical and may have an axis 116. The tube may have first and second open ends 110 and 112, respectively. The tube may be configured to be supported by a generally planar substructure. For example, the tube 102 may be configured such that, when placed on the ground, the tube 102 is stable and provides a cylinder that rises at a 90-degree angle with respect to the ground. The tube 102 may be portable and may thus have properties that contribute to the portability of the tube 102. For example, the tube 102 may have a weight that does not exceed 5 kilograms. Additionally or alternatively, the tube 102 may have an interior diameter that does not exceed 15 centimetres. Additionally or alternatively, the tube 102 may have a length that does not exceed 120 centimeters.

As shown in FIG. 1A, the tube 102 may have one or more holes 104. The tube 102 may have at least one pair of holes 104, and the at least one pair of holes 104 may be at least one pair of diametrically opposing holes. In this context, the expression "diametrically opposing holes" refers to a pair of holes 104 being positioned opposite one another along a diameter of the tube 102. In this way, each of the at least one pair of diametrically opposing holes 104 may be operable to support an elongated pin 106 therethrough, such that the elongated pin 106 may be supported perpendicular to the axis 116 of the tube. The elongated pin 106 may have a handle 114, which may provide a user of the apparatus 100 with ease of use. The apparatus 100 may be arranged such that a mass 108 may be placed upon the elongated pin 106 through the first open end 110 of the tube 102. The example apparatus 100 may be arranged such that upon removal of the elongated pin 106 from the tube 102, the mass 108 may travel through the tube 102 and exit the tube 102 through the second open end 112 of the tube 102.

In some embodiments, the tube 102 may be composed of a non-deformable material. For example, the tube may be composed of polyvinyl chloride (PVC) or acrylonitrile butadiene styrene (ABS) or the like. In some embodiments, the tube may have a length measuring between 60 cm and 120 cm and may have an interior diameter measuring between 10 cm and 15 cm. In some embodiments, the tube 102 may have a weight that does not exceed 5 kg. In some embodiments, the tube 102 may have multiple pairs of diametrically opposing holes 104 which may allow the elongated pin 106 to be placed at different heights and/or to provide ease of use of the apparatus 100. In some embodiments, the tube 102 may have no diametrically opposing holes 104. In such embodiments, the mass 108 may be released directly into the first open end 110 of the tube 102. In such embodiments, the elongated pin 106 may not form part of the apparatus 100.

The apparatus 100 may be portable. For example, the apparatus 100 may have properties that allow the apparatus 100 to be carried in a backpack by a user. Additionally or alternatively, the apparatus 100 may have a total weight that does not exceed 25 kilograms.

Figure 1B:
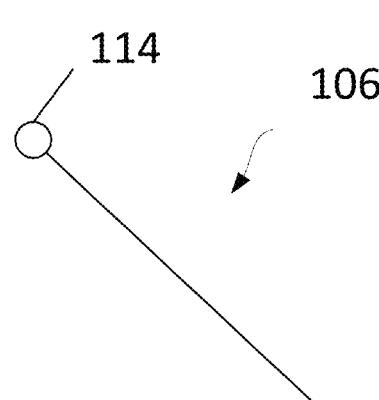
FIG. 1B is a is a front view of the elongated pin shown in FIG. 1A.

FIG. 1B is a front view of the elongated pin 106. The elongated pin 106 may include a handle 114. The handle 114 may provide a user of the apparatus 100 with ease of use. The handle 114 may be a loop, or the handle 114 may be of another type, such as an L-shaped pull.

Figure 1C:
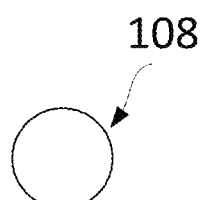
FIG. 1C is a front view of the mass shown in FIG. 1A.

FIG. 1C is a front view of the mass 108. The mass may be one or more of a weight, shot, pellet, ball, bullet, cartridge, slug etc. The mass 108 may be adapted to be received through the first and second open ends 110, 112 of the tube 102. In other words, the mass 108 may have dimensions such that the mass 108 may enter the tube 102 through the first open end 110, travel through the tube 102, and exit the tube 102 through the second open end 112. When the elongated pin 106 is placed through the tube 102, the mass 108 may be adapted so that it may rest upon the elongated pin 106.

The mass 108 may be constructed of a non-deformable material; for example, the mass 108 may be constructed of steel, iron, composite material, or the like. The mass 108 may be portable and may thus have dimensions that contribute to the portability of the mass 108. For example, the mass 108 may have a weight between 4 kg and 20 kg. Additionally or alternatively, the mass 108 may have a diameter between 8 cm and 23 cm.

The mass 108 may be a sphere, as shown in FIG. 1A and FIG. 1C. The mass may be, for example, a bowling ball. However, the mass 108 may take a variety of forms. For example, the mass 108 may be, or may have a shape similar to, a prism or a pyramid. The mass 108 may be, or may have a shape similar to, a cylinder or a cone. The mass 108 may also be of an irregular shape. For example, the mass 108 may be a common rock, or be of a form similar to a common rock, in some instances.

The diameter of the interior of the tube 102 may be larger than a width of the mass 108 providing a gap between the interior of the tube 102 and the mass 108 when the mass 108 passes through the tube 102. The presence of the gap may provide for the uninterrupted travel of the mass 108 through the tube 102. The gap may be of various widths. The gap may have a width of at least six millimeters.

Figure 2A:
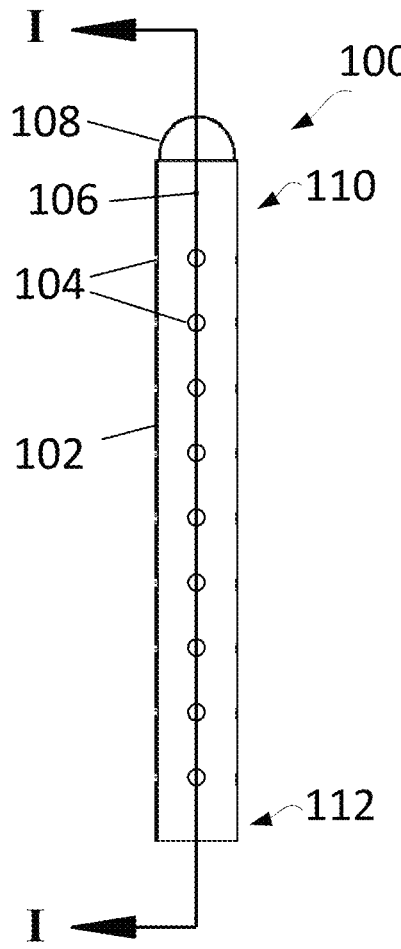
FIG. 2A is a side view of the example apparatus 100 shown in FIG. 1A.
Figure 2B:
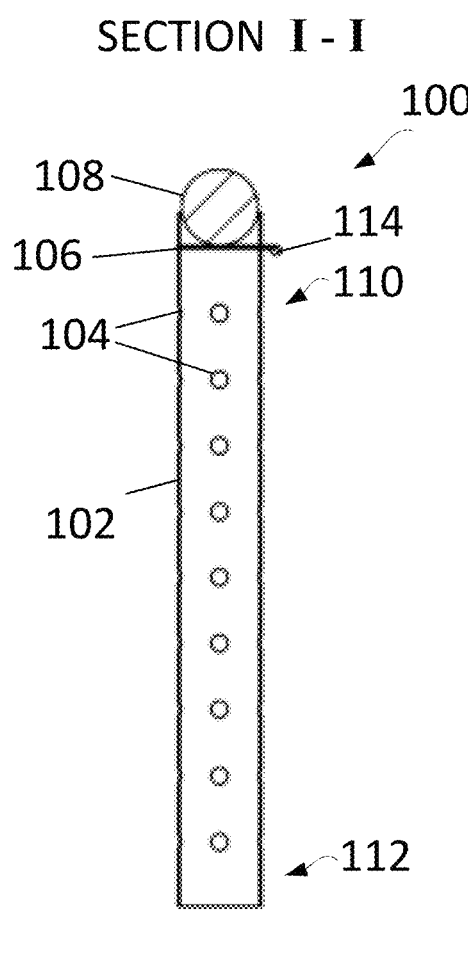
FIG. 2B is a section view of FIG. 2A along cross-section I-I of FIG. 2A.

Reference is now made to FIG. 2A and FIG. 2B. FIG. 2A is a side view of the example apparatus 100 shown in FIG. 1A. FIG. 2B is a section view of FIG. 2A along cross-section I-I of FIG. 2A.

FIG. 2A illustrates an example apparatus 100 including an elongated pin 106, a mass 108, a tube 102 having first and second open ends 110, 112, and one or more holes 104. In the illustrated example, the tube 102 includes a first set of multiple pairs of diametrically opposing holes 104 that are opposed about a first diameter of the tube 102. In the illustrated example, the tube 102 also includes a second set of multiple pairs of diametrically opposing holes 104 that are opposed about a second diameter of the tube 102, the second diameter of the tube 102 being perpendicular to the first diameter of the tube 102. The two sets of multiple pairs of diametrically opposing holes 104 may allow the elongated pin 106 to be placed at different heights and/or may provide ease of use of the example apparatus 100. As shown, cutting plane I-I passes through the centre of apparatus 100.

FIG. 2B is a sectional view of the example apparatus 100 along cutting plane I-I shown in FIG. 2A. Similar to FIG. 2A, FIG. 2B illustrates an elongated pin 106, a mass 108, a tube 102 having first and second open ends 110, 112, and one or more holes 104. In this example, the mass 108 is shown as being solid, as indicated by the oblique lines through the mass 108, as shown. Alternatively, the mass 108 may be hollow or may contain one or more holes. FIG. 2B clearly illustrates an embodiment including the elongated pin 106 supporting the mass 108. The handle 114 is shown extending through the tube 102. The handle 114 may provide ease of use to a user during removal of the elongated pin 106 through the tube 102. FIGS. 2A and 2B illustrate an embodiment of the example apparatus 100 having a first set of multiple pairs of diametrically opposing holes 104 that are opposed about a first diameter of the tube 102. FIGS. 2A and 2B illustrate an embodiment of the example apparatus 100 also having a second set of multiple pairs of diametrically opposing holes 104 that are opposed about a second diameter of the tube 102. In these illustrations, the first and second diameters of the tube 102 are perpendicular to one another. This arrangement may provide ease of use to a user when placing the elongated pin 106 through a pair of diametrically opposing holes 104 and may allow the user to place the elongated pin at different heights.

Figure 3:
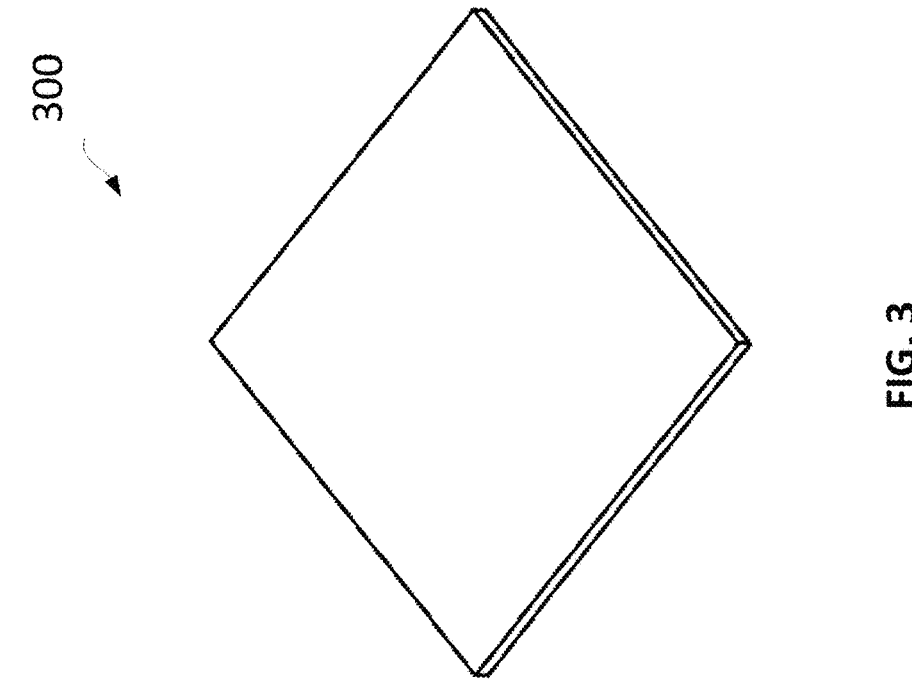
FIG. 3 illustrates an example mat, in accordance with an embodiment of the present application.

FIG. 3 shows an example mat 300 in accordance with one aspect of the present application. The example mat 300 may be a shock-absorbing mat, and may have a rectangular shape, a consistent thickness, and uneven edges. The example mat 300 may be formed of rubber. The example mat 300 may have a generally planar upper facing. The example mat 300 may be a commercially available mat, such as the GenieMat FIT08™. Various embodiments of the present application may include a mat 300 that may take a variety of forms. For example, the mat 300 may have a circular shape, an oval shape, a triangular shape, or an irregular shape. The mat 300 may have edges that are even and/or the mat 300 may have edges that are uneven. The mat 300 may have a consistent thickness, or the mat 300 may have an inconsistent thickness. The mat may have, for example, a thickness of between 5 mm and 10 mm. The mat 300 may have shock-absorbing properties. The mat 300 may be formed of a polymer, such as an elastomer. The mat 300 may be portable and may have properties that contribute to the portability of the mat 300. For example, the mat 300 may have a weight that does not exceed 5 kilograms. The mat 300 may have a surface area that does not exceed 1 square meter.

Figure 4:
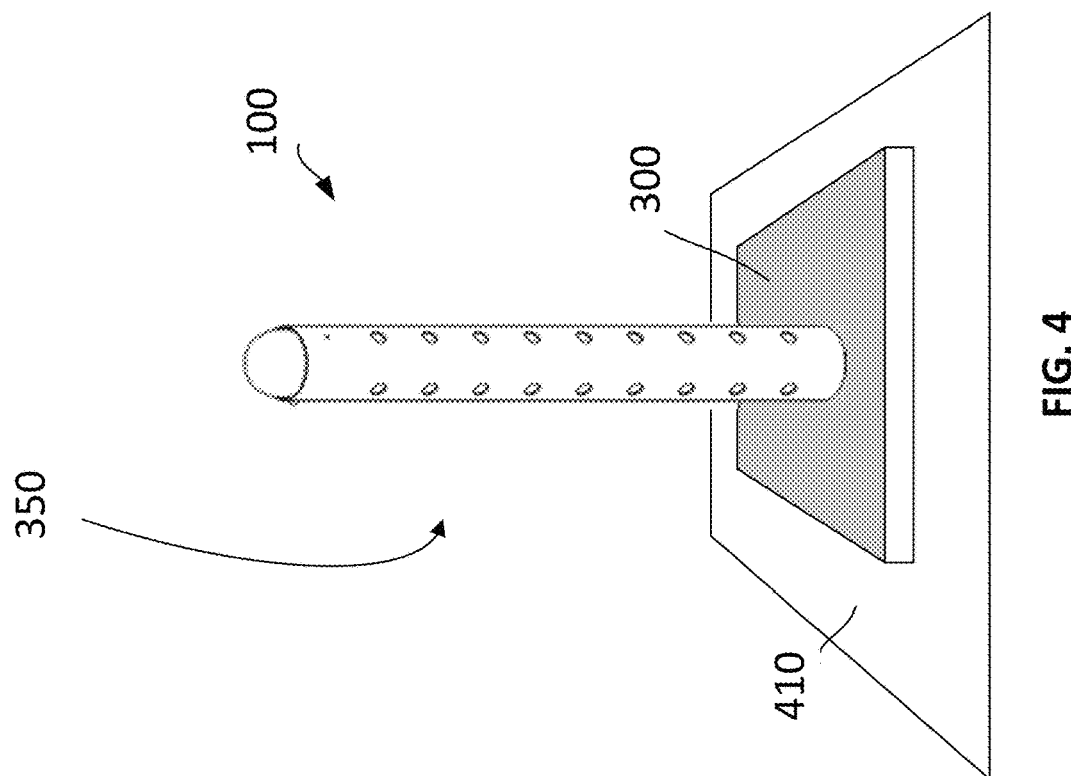
FIG. 4 illustrates an example kit upon a surface, in accordance with an embodiment of the present application.

FIG. 4 illustrates an example kit 350 in accordance with one embodiment of the present application. The example kit 350 may comprise the example apparatus 100 of FIG. 1A-FIG. 2B together with the example mat 300 of FIG. 3. FIG. 4 illustrates the example apparatus 100 positioned upon the example mat 300. In this embodiment, the example mat 300 is placed directly on a surface 410. The surface 410 may be, for example, a slab. In some embodiments, the example apparatus 100 may be held by a user. Alternatively, the example apparatus 100 may be freestanding, i.e., the apparatus 100 may be placed in such a way that the tube 102 remains perpendicular to the surface 410 without additional structural support.

Consistent with previous description, the components of the kit 350 may have properties that contribute to their respective portability. Additionally, the components of the kit 350 may have properties that contribute to their cumulative portability. In other words, the components may have properties that contribute to the overall portability of the kit 350. For example, the kit 350 may have a total weight that does not exceed 30 kilograms. In other words, the tube, the elongated pin, the mass, and the mat may have a combined weight that does not exceed 30 kilograms.

The components of the kit 350 may have other properties, for example, dimensions, such that the kit 350 may be easily carried by a user from one destination to another. For example, the components of the kit 350 may fit into a backpack.

Reference will now be made to FIG. 5 which illustrates in flowchart form a method 500 of measuring acoustic properties of a surface. Examples of the method 500 will be discussed with reference to the example embodiment 600 of FIG. 6, which illustrates a user 610 performing an example method of the present application. Example embodiment 600 shows the user 610; the kit 350, including the apparatus 100 and the mat 300; the surface 410 and the acoustic measurement instrumentation 620.

The method 500 may include, at step 502, providing acoustic measurement instrumentation 620 beneath the surface 410. As illustrated by the example embodiment 600, the surface 410 may be a slab. The acoustic measurement instrumentation 620 may be placed beneath the surface 410. The acoustic measurement instrumentation 620 may be, for example, a sound level meter, sometimes referred to as a sound pressure level (SPL) meter, decibel (dB) meter, noise meter or noise dosimeter, Additionally or alternatively, a vibration meter may be placed beneath the surface 410. In some embodiments, the acoustic measurement instrumentation 620 may be temporarily or permanently installed beneath the surface 410. In some embodiments, the acoustic instrumentation may be hand-held and may be provided by one or more auxiliary users of the method 500.

At step 504, a mat 300 may be placed upon the surface 410. The mat 300 may be a shock-absorbing mat. In some embodiments, prior to placing the mat 300, any existing flooring may be removed from the surface 410 so that the mat 300 may be placed directly upon the surface 410, which may be, for example, a slab, as will be further described with reference to FIG. 7.

At step 506 a tube 102 is vertically positioned upon the mat 300. In other words, the tube 102 may be positioned such that a length of the tube is perpendicular to the surface. In some preferred embodiments, the tube 102 is vertically positioned in the centre of the mat 300. The tube 102 may be placed such that it is freestanding, i.e., the tube 102 may be placed in such a way that the length of the tube remains perpendicular to the surface 410 without additional structural support. Alternatively, the tube 102 may be supported in a vertical position, for example, by supporting means such as the hand of the user 610. Notably, the example embodiment 600 illustrates a particular example where the tube 102 is freestanding and the user 610 has engaged the handle 114 of the elongated pin 106 by hand in preparation for releasing the elongated pin 106 from the tube 102.

At step 508, the user 610 may position an elongated pin 106 through a first pair of diametrically opposing holes 104. In embodiments where the tube 102 has multiple pairs of diametrically opposing holes 104 provided at varying heights, the user 610 may select the pair of diametrically opposing holes 104 corresponding to a desired height. As previously described, in some embodiments, the tube 102 may not have any pairs of diametrically opposing holes 104, and/or the user 610 of the apparatus 100 may wish to avoid the use of the elongated pin 106. In some such embodiments, step 508 may be omitted.

At step 510, a mass 108 may be positioned within the tube 102 such that the mass 108 rests upon the elongated pin 106. In some embodiments, after positioning the mass 108, depending on the position of the elongated pin 106, some or all of the mass 108 may extend beyond the first open end 110 of the tube 102, as shown in the examples of FIGS. 1A, 2A, 2B, 4 and 7. As previously described, in some embodiments, the tube 102 may not have any pairs of diametrically opposing holes 104 and/or the user 610 may wish to avoid the use of the elongated pin 106. In some such embodiments, instead of positioning the mass 108 such that it rests upon the elongated pin 106, the mass 108 may be suspended at or near the first open end 110 of the tube 102. For example, the mass 108 may be held by hand at or near the first open end 110 of the tube 102.

At step 512, the elongated pin 106 may be removed from the tube 102 such that the mass 108 falls through a bottom portion of the tube 102 onto the surface 410. In other words, the elongated pin 106 may be removed from the tube 102 such that the mass 108 falls through the second open end 112 of the tube 102 onto the surface 410. In this way, the mass 108 may apply a first force to the mat 300. As a result, a second force may be transferred by the mat 300 to the surface 410 beneath the mat 300. In turn, a third force may be transferred by the surface 410 to the environment below the surface 410. The magnitude of the third force may depend, in one aspect, upon the acoustic properties of the surface 410. The third force, and/or an effect thereof, may subsequently be measured by the acoustic measurement instrumentation 620 that may have been provided beneath the surface 410 at step 502.

At step 514, a first resulting output may be obtained. The first resulting output may be provided by the acoustic measurement instrumentation 620. The first resulting output may be obtained by the user 610 or by an auxiliary user by reading the acoustic instrumentation. Additionally or alternatively, the first resulting output may be obtained electronically by one or more computing devices.

In some instances, an averaged measurement may be preferred. As a result, in some embodiments, more than one output may be obtained for the same surface 410 using the same apparatus 100, mat 300 and desired height. To this end, reference is made to FIG. 7, which illustrates in flowchart form a method 700 of determining an average resulting output. The method 700 may include, at step 514, obtaining a first resulting output. A first resulting output may be obtained as previously outlined in the steps of the method 500 of FIG. 5.

Next, at step 702, steps 506 to 512, inclusive, may be repeated. At step 704, a second resulting output may be obtained. As with the first resulting output, the second resulting output may be provided by the acoustic measurement instrumentation 620. The second resulting output may be obtained by the user 610, or by an auxiliary user, for example, by reading the acoustic instrumentation. Additionally or alternatively, the second resulting output may be obtained electronically by one or more computing devices.

At this stage of the method 700, step 702, (i.e., repeating steps 506 to 512), may be repeated. Thereafter, at step 708, a second resulting output may be obtained. As with the first resulting output, the third resulting output may be provided by the acoustic measurement instrumentation 620. The third resulting output may be obtained by the user 610, or by an auxiliary user, for example, by reading the acoustic instrumentation. Additionally or alternatively, the third resulting output may be obtained electronically by one or more computing devices.

At step 710, an average resulting output may be determined. The averaged resulting output may be determined by the user 610, or by an auxiliary user. The user 610, or an auxiliary user, may determine the average resulting output mentally, by using pen and paper, or by using a calculator. Additionally or alternatively, the average resulting output may be determined by a computing device. In some embodiments, when the first, second and third outputs are obtained by a computing device, the average resulting output may also be obtained by the computing device.

The method 700 may have several variations. For example, the method 700 may omit the second instance of step 702 and may omit step 708. In such instances, the average resulting output may be determined based on the first and second resulting outputs. Another example variation of the method 700 may include additional repetitions of step 702. In such variations, following each repetition of step 702, a subsequent resulting output may be obtained. As a result, in such variations, step 710 will include the averaging of a number of resulting outputs that is equal to the number of repetitions of step 702 that have been performed in that variation.

Figure 8:
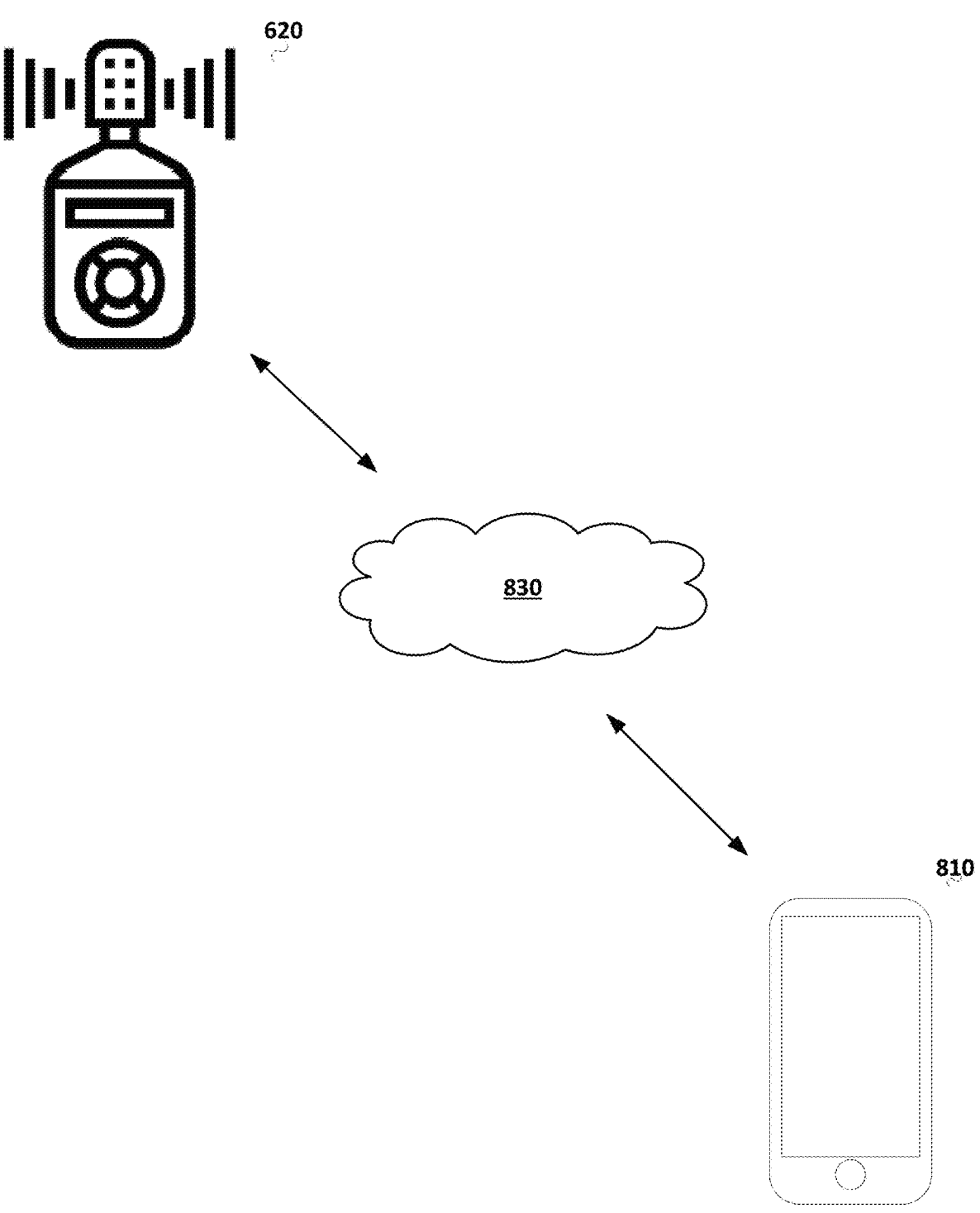
FIG. 8 is a schematic operation diagram illustrating an operating environment of an example embodiment of the present application.

FIG. 8 will now be discussed. FIG. 8 is a schematic operation diagram illustrating an operating environment of an example embodiment. As illustrated, acoustic measurement instrumentation 620 communicates with a first computing device 810 via a network 830. The network 830 may be a wireless network. The network 830 may utilize direct wireless communication, such as, for example, Bluetooth™. Additionally or alternatively, the network may include physical connections to the acoustic measurement instrumentation 620 and/or to the first computing device 810. The physical connections may be, for example, cable connections. The first computing device 810 is both a computer system and a computing device.

The acoustic measurement instrumentation 620 may measure ambient sound levels by calculating the pressure of the sound waves traveling through the air from a source of noise. The acoustic measurement instrumentation 620 may be a sound level meter, also known as a sound pressure level meter (SPL). The acoustic measurement instrumentation 620 may or may not be hand-held.

The acoustic measurement instrumentation 620 may include an acoustic measurement sensor such as a microphone and/or an accelerometer. The acoustic measurement instrumentation 620 may also include a signal conditioning system such as one or more of an analog-to-digital converter (ADC), and an anti-aliasing filter. The acoustic measurement instrumentation 620 may also include an acoustic analysis component.

The acoustic measurement instrumentation 620 may be designed to meet international standards such as International Electrotechnical Commission (IEC) 60651, IEC 60804 and American National Standards Institute (ANSI)

S1.4. The acoustic measurement instrumentation 620 may be graded as type or class 0-3.

The acoustic measurement instrumentation 620 may also be a virtual software meter. For example, an auxiliary computing device may be adapted to operate as a virtual software meter. The auxiliary computing device may be, for example, a smartphone, a tablet, or a laptop, and may includes a variety of modules, such as those that will be described with reference to FIG. 10. The auxiliary computing device may be adapted to operate as a virtual software meter through the implementation of application software. Examples of application software which may adapt the auxiliary computing device in this way may include Sound Pressure Level (SPL) Meter™ Audacity™, Virtual Sound Level Meter™ and Darkwood Designs™ Audio Level Meters.

The acoustic measurement instrumentation 620 may provide output. For example, the acoustic measurement instrumentation 620 may provide output corresponding to ambient sound levels. For example, output corresponding to ambient sound levels may be provided in decibels (dB) or in weighted decibels, such as A-weighted decibels (dBA). Additionally or alternatively, the acoustic measurement instrumentation 620 may provide output corresponding to ambient vibration. For example, output corresponding to ambient vibration may be provided in metres per second squared $(m/s^2)$ The network 830 is a computer network. In some embodiments, the network 830 may be an internetwork such as may be formed of one or more interconnected computer networks. For example, the network 830 may be or may include an Ethernet network, an asynchronous transfer mode (ATM) network, a wireless network, or the like.

As further described below, the first computing device 810 may be adapted to present a user interface. The first computing device 810 may co-operate with the acoustic measurement instrumentation 620 to present the user interface including a listing of the one or more particular sound reduction apparatuses.

Figure 9:
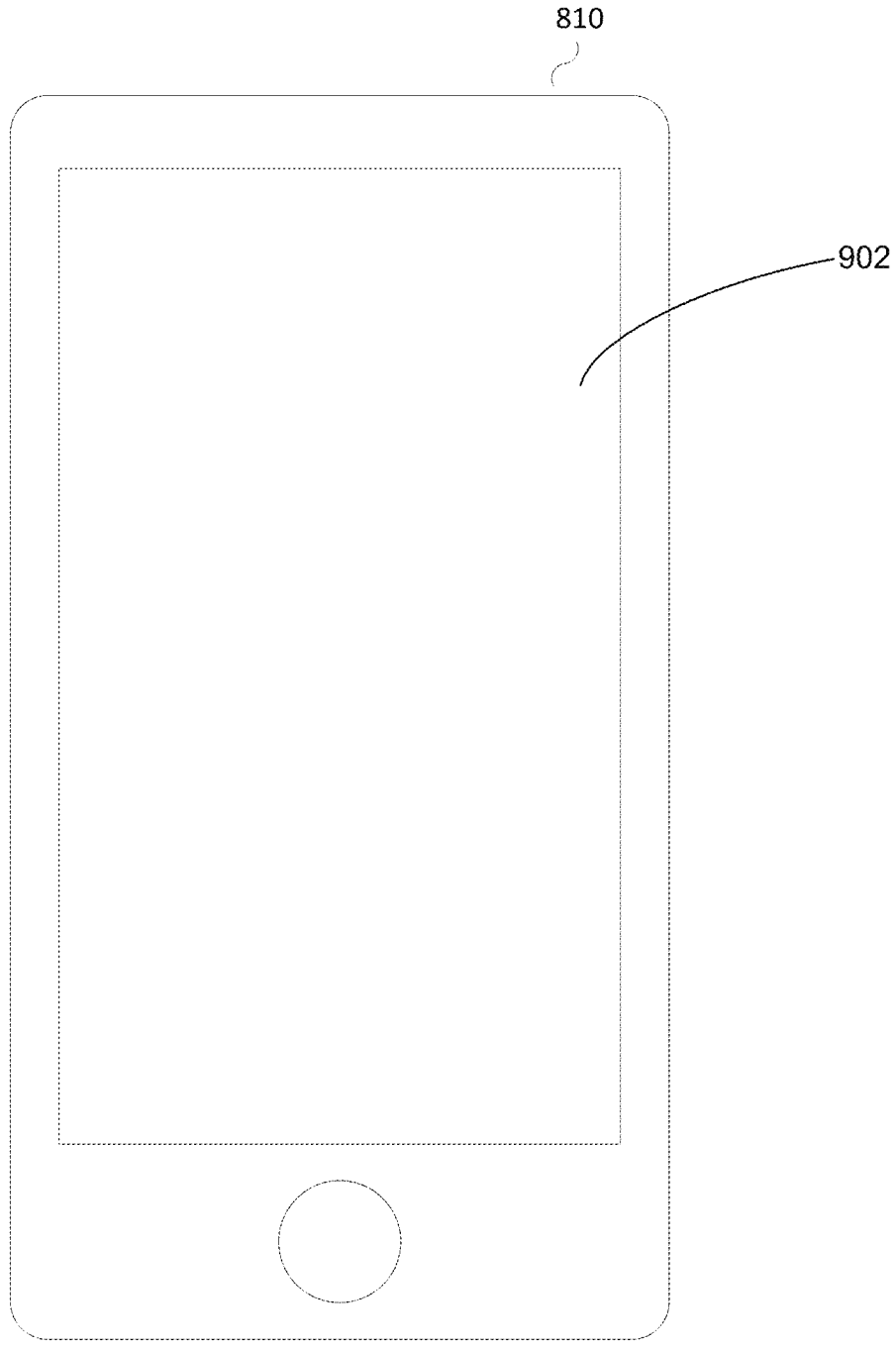
FIG. 9 shows the front of the first computing device of FIG. 8.

FIG. 9 shows the front of the first computing device 810. The first computing device 810 may be a computer system such as, for example, a laptop, a desktop, a mobile device, and/or a wearable. In some embodiments, the first computing device may be a smartphone as shown in FIG. 8. In other embodiments, the first computing device 810 may be another form of first computing device such as, for example, a tablet or a laptop.

As illustrated, the front of the first computing device 810 includes a display 902. The display 902 is a module of the first computing device 810. The display 902 is for presenting graphics. The display 902 may be, for example, a liquid crystal display (LCD). In addition to being an output device, the display 902 may also be an input device. For example, the display 902 may allow touch input to be provided to the first computing device 810. In other words, the display 902 may be a touch sensitive display module. In a particular example, the display 902 may be a capacitive touch screen.

Figure 10:
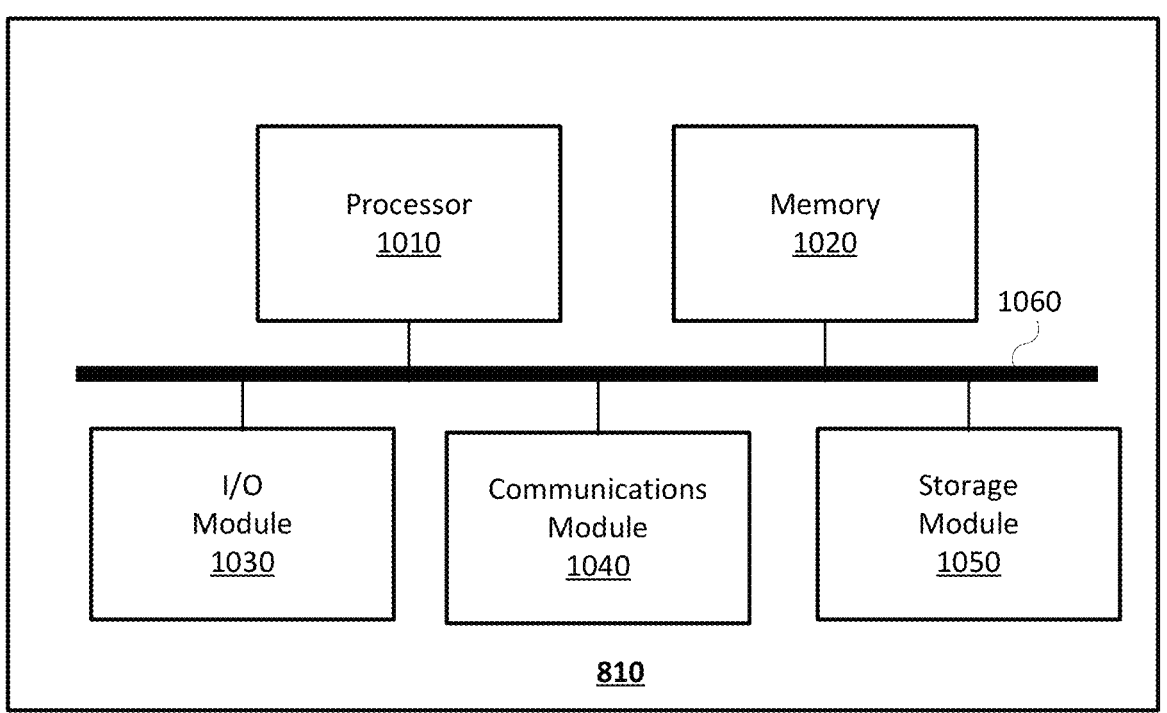
FIG. 10 is high-level schematic diagram of the first computing device of FIG. 9.

FIG. 10 is a high-level schematic diagram of the first computing device 810.

The first computing device 810 includes a variety of modules. For example, as illustrated, the first computing device 810 may include a processor 1010, a memory 1020, a communications module 1040, an I/O module 1030, and/or a storage module 1050. As illustrated, the foregoing example modules of the first computing device 810 are in communication over a bus 1060.

The processor 1010 is a hardware processor. The processor 1010 may, for example, be one or more ARM, Intel x86, PowerPC processors or the like.

The memory 1020 allows data to be stored and retrieved. The memory 1020 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the first computing device 810.

The I/O module 1030 is an input module and an output module. As an input module, the I/O module 1030 allows the first computing device 810 to receive input from components of the first computing device 810. As an output module, the I/O module 1030 allows the first computing device 810 to provide output to components of the first computing device 810. For example, the I/O module 1030 may allow the first computing device 810 to provide output to and/or receive input from the display 902. As a further example, the I/O module may allow the first computing device 810 to provide output to and/or receive input from a camera (not shown). The camera (not shown) may be a component of the first computing device 810.

The communications module 1040 allows the first computing device 810 to communicate with other computing devices and/or various communications networks, such as, for example, the network 830. The communications module 1040 may allow the first computing device 810 to send or receive communications signals. Communications signals may be sent or received according to one or more protocols or according to one or more standards. For example, the communications module 1040 may allow the first computing device 810 to communicate via a cellular data network, such as, for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 1040 may allow the first computing device 810 to communicate using near-field communication (NFC), via Wi-Fi™, using Bluetooth™ or via some combination of one or more networks or protocols. In some embodiments, all or a portion of the communications module 1040 may be integrated into a component of the first computing device 810. For example, the communications module may be integrated into a communications chipset.

The storage module 1050 allows data to be stored and retrieved. In some embodiments, the storage module 1050 may be formed as a part of the memory 1020 and/or may be used to access all or a portion of the memory 1020. Additionally or alternatively, the storage module 1050 may be used to store and retrieve data from persisted storage other than the persisted storage (if any) accessible via the memory 1020. In some embodiments, the storage module 1050 may be used to store and retrieve data in/from a database. A database may be stored in persisted storage. Additionally or alternatively, the storage module 1050 may access data stored remotely such as, for example, as may be accessed using a local area network (LAN), wide area network (WAN), personal area network (PAN), and/or a storage area network (SAN). In some embodiments, the storage module 1050 may access data stored remotely using the communications module 1040. In some embodiments, the storage module 1050 may be omitted and its function may be performed by the memory 1020 and/or by the processor 1010 in concert with the communications module 1040 such as, for example, if data is stored remotely.

The storage module 1050 may store information relating to one or more sets of specifications for one or more particular acoustic insulation apparatuses. The one or more particular acoustic insulation apparatuses may include, for example, one or more types of flooring underlay, one or more types of vibration isolator, and one or more types of floor coverings. Additionally or alternatively, the one or more acoustic insulation apparatuses may be or include a ceiling treatment. The one or more specifications may describe various features and properties of the one or more acoustic insulation apparatuses, such as corresponding isolation efficiency data, noise reduction data, installation data, size and thickness data, static deflection data, Water, Petroleum, Alkali and Fuel Resistance data, density data, data corresponding to one or more ASTM standards, feature and benefit data, pricing data, etcetera.

Software comprising instructions is executed by the processor 1010 from a computer-readable medium. For example, software may be loaded into random-access memory from persistent storage of the memory 1020. Additionally or alternatively, instructions may be executed by the processor 1010 directly from read-only memory of the memory 1020.

Figure 11:
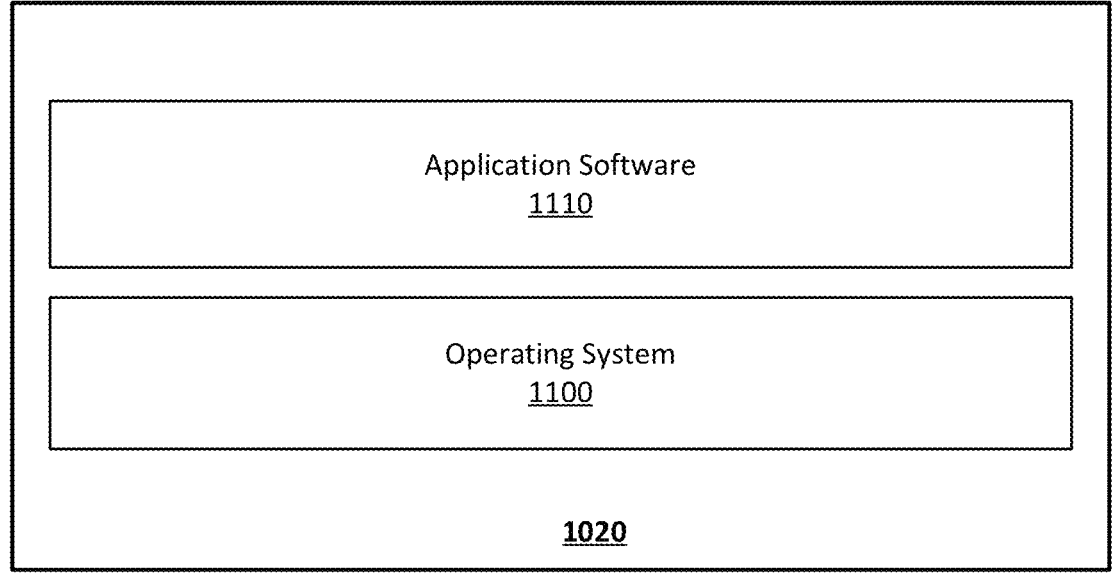
FIG. 11 shows a simplified organization of software components stored in a memory of the first computing device of FIG. 1.

FIG. 11 depicts a simplified organization of software components stored in the memory 1020 of the first computing device 810. As illustrated, these software components include an operating system 1100 and an application software 1110.

The operating system 1100 is software. The operating system 1100 allows the application software 1110 to access the processor 1010 (FIG. 10), the memory 1020, the communications module 1040, the I/O module 1030, and the storage module 1050 of the first computing device 810. The operating system 1100 may be, for example, Google™ Android™, Apple™ iOS™, UNIX™, Linux™, Microsoft™ Windows™, Apple OSX™ or the like.

The application software 1110 adapts the first computing device 810, in combination with the operating system 1100, to operate as a device for generating and presenting one or more a user interfaces including a listing of the one or more particular sound reduction apparatuses. Where the first computing device 810 is a smartphone or tablet, the application software 1110 may itself be or may be a part of a smartphone or tablet application or "app". In a particular example, the application software 1110 may correspond to a sound reduction apparatus recommendation app.

Figure 12:
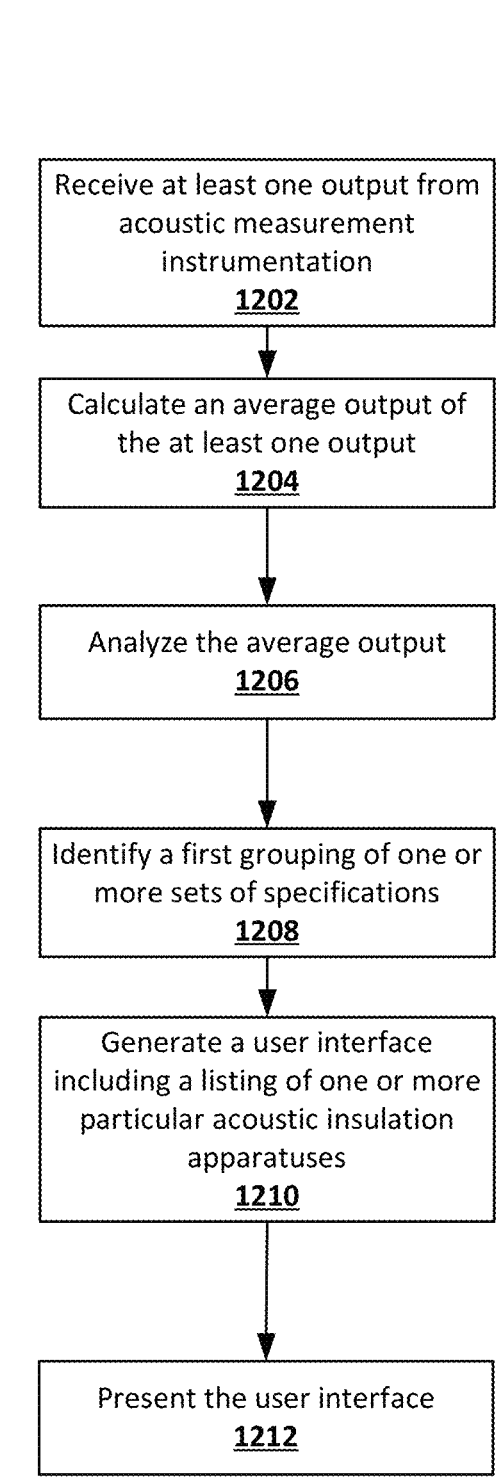
FIG. 12 is a flowchart depicting example operations performed in a method of presenting a user interface, in accordance with an embodiment of the present application.

FIG. 12 provides a flowchart depicting example operations performed in a computer-implemented method 1200 of presenting a user interface, the user interface including a listing of one or more particular sound reduction apparatuses. Operations starting with an operation 1202 and continuing onward are performed by the processor 1010 (FIG. 10) of the first computing device 810 executing software comprising instructions such as may be stored in the memory 1020 of the first computing device 810.

At the operation 1202, at least one output from acoustic measurement instrumentation is received. The at least one output represents an effect of a mass being dropped through a tube onto a floor after pulling a pin. The floor may include a subfloor and one or more floor coverings. The subfloor may be a slab. The one or more floor coverings may be a mat, such as the example mat 300 shown in FIG. 3 and described above with reference to FIG. 3. The at least one output may be obtained, for example, by the method 500, described above with reference to FIG. 5. The output may be received from the acoustic measurement instrumentation 620 of FIG. 8. The output may correspond to ambient sound levels and may be provided, for example, in decibels (dB) or in weighted decibels, such as A-weighted decibels (dBA). Additionally or alternatively, the output may correspond to ambient vibration, and may be provided, for example, in metres per second squared (m/s²).

At the operation 1204, the first computing device 810 calculates an average output of the at least one output received from the acoustic measurement instrumentation. The average output may be calculated, for example, in accordance with the described method 700 of FIG. 7.

At the operation 1206, the first computing device 810 analyzes the average output. In some embodiments, analyzing the average output may include comparing the average output to one or more sets of specifications, each of the one or more sets of specifications corresponding to one or more particular acoustic insulation apparatuses. The one or more particular acoustic insulation apparatuses may include, for example, one or more types of flooring underlay, one or more types of vibration isolator, and one or more types of floor coverings. The one or more specifications may describe various features and properties of the one or more acoustic insulation apparatuses, such as corresponding isolation efficiency data, noise reduction data, installation data, size and thickness data, static deflection data, Water, Petroleum, Alkali and Fuel Resistance data, density data, data corresponding to one or more ASTM standards, feature and benefit data, pricing data, etcetera.

At the operation 1208, the first computing device 810 identifies a first grouping of one or more sets of specifications. The first grouping may include one or more particular acoustic insulation apparatuses. The first grouping may be identified based on the comparison of the average output to the one or more sets of specifications associated with the one or more identified particular acoustic insulation apparatuses. The first grouping may be identified based on a correspondence between the average output and the one or more sets of specifications associated with the one or more identified particular acoustic insulation apparatuses. The first grouping may be identified using a rule-based approach.

In some embodiments, first computing device 810 may perform operation 1204 to operation 1208 of the computer-implemented method 1200. In some embodiments, one or more of operation 1204 to operation 1208 may be delegated to and performed by a server, such as a web server, after receiving the data associated with the completion of the previous step from the first computing device 810. In such embodiments, after performing the delegated steps, the server may send the resulting data to the first computing device 810, and the first computing device 810 may then continue to perform the remaining steps of the computer-implemented method 1200.

At the operation 1210, the first computing device 810 generates a user interface. The user interface may include a listing of the one or more identified particular acoustic insulation apparatuses. In other words, the user interface may include a listing of the one or more particular acoustic insulation apparatuses associated with the one or more sets of specifications of the first grouping.

At the operation 1212, the first computing device 810 presents the user interface. For example, the first computing device 810 may present the user interface using an output module such as, for example, the I/O module 1030. For example, the first computing device 810 may use the output module to present the user interface by using the display 902 of FIG. 9, for example. The user interface may include a listing of the one or more identified particular acoustic insulation apparatuses. In other words, the user interface may include a listing of the one or more particular acoustic insulation apparatuses associated with the one or more sets of specifications of the first grouping. In this way, the user 610, or an auxiliary user, may be provided with a listing of acoustic insulation apparatuses suitable for providing the floor and/or surface 410 with acoustic insulation.

Figure 13:
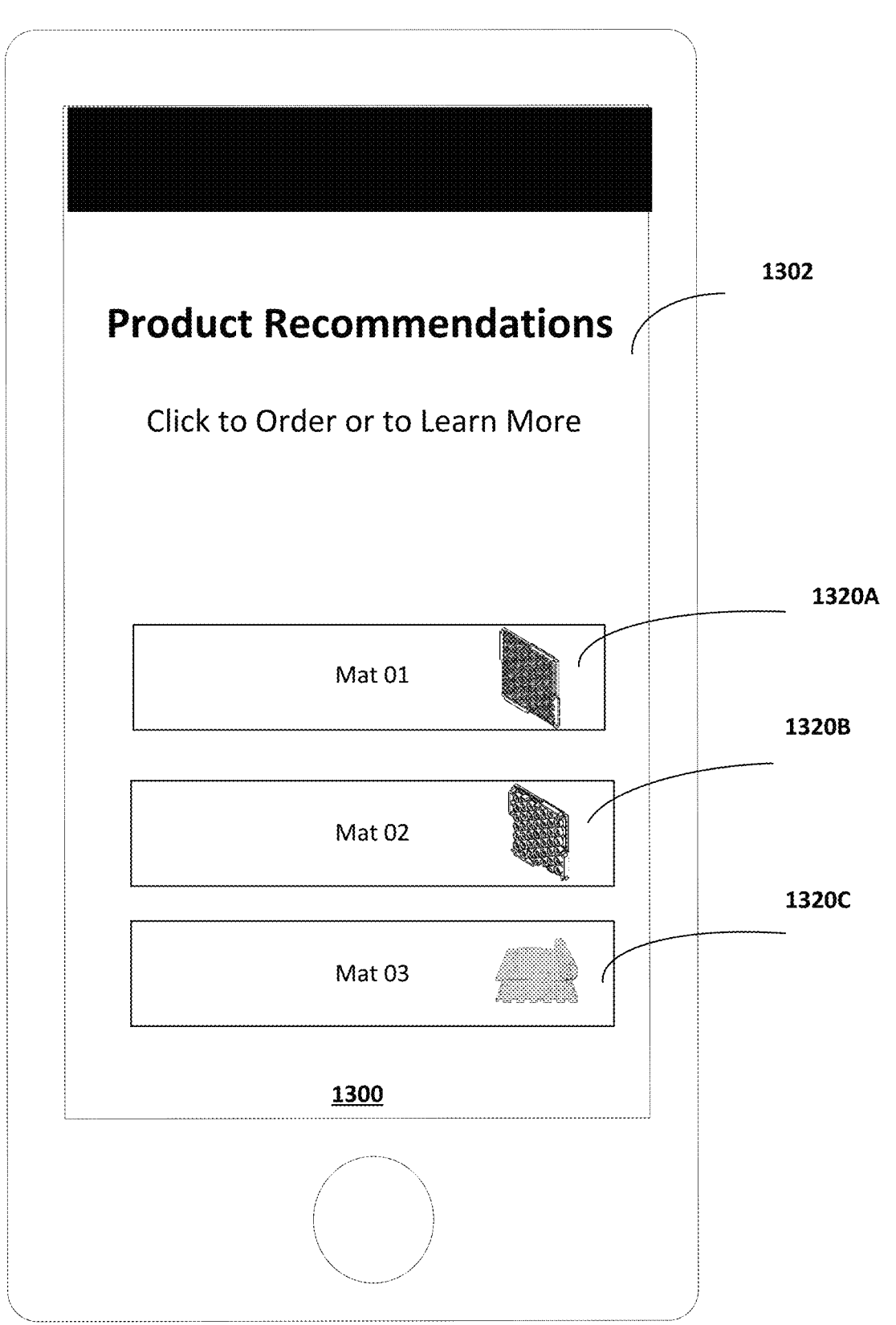
FIG. 13 shows an example user interface for use in presenting a listing of one or more identified particular acoustic insulation apparatuses, in accordance with an embodiment of the present application.

An example user interface 1300 for presenting a listing of one or more identified particular acoustic insulation apparatuses is provided in FIG. 13. The listing of one or more particular acoustic insulation apparatuses may include, for example, one or more types of flooring underlay, one or more types of vibration isolator, and one or more types of floor coverings.

As illustrated, the example user interface 1300 includes a message 1302, and identified particular acoustic insulation apparatuses indications 1320A-1320C. Each of the indications 1320A-1320C may correspond to one or more identified particular acoustic insulation apparatuses.

The user 610, or an auxiliary user, may select an indication, and this indication may be received as input by the first computing device 810. For example, such input may be received using an input module such as, for example, the I/O module 1030. The input may correspond to a HyperText Markup Language (HTML) link to a webpage containing further information about the selected one or more particular acoustic insulation apparatuses. Additionally or alternatively, responsive to the input, a software application used to initiate purchases of the one or more selected particular acoustic insulation apparatuses may be launched. Notably, it may be that the one or more selected particular acoustic insulation apparatuses corresponds one-to-one with a particular merchant. In such a case, launching a software application used to initiate purchases of the one or more selected particular acoustic insulation apparatuses may correspond to launching an application supplied by and/or corresponding to that particular merchant.

The received input may take a variety of forms. For example, input may be received interacting with an indication such as, for example, the indications 1320A-1320C. In a particular example, where the display 902 is a touchscreen, the received input may correspond to a touch interaction with an indication.

Referring once again to FIG. 3, the mat 300 may comprise a particular type of acoustic insulation apparatus. The particular type of acoustic insulation apparatus may be associated with a particular composition and/or thickness. In at least some implementations, the mat 300 may be a pre-calibrated mat. That is, profile or calibration data, such as force pulse data, may be obtained for the individual mat 300 prior to any on-site testing. For example, the force pulse data may be obtained in a laboratory setting and may be stored in a memory and used later to facilitate on-site testing. In this way, force pulse data corresponding to a particular type of acoustic insulation apparatus in isolation may be stored in a memory and used later to facilitate on-site testing. Such techniques will now be described.

Figure 14:
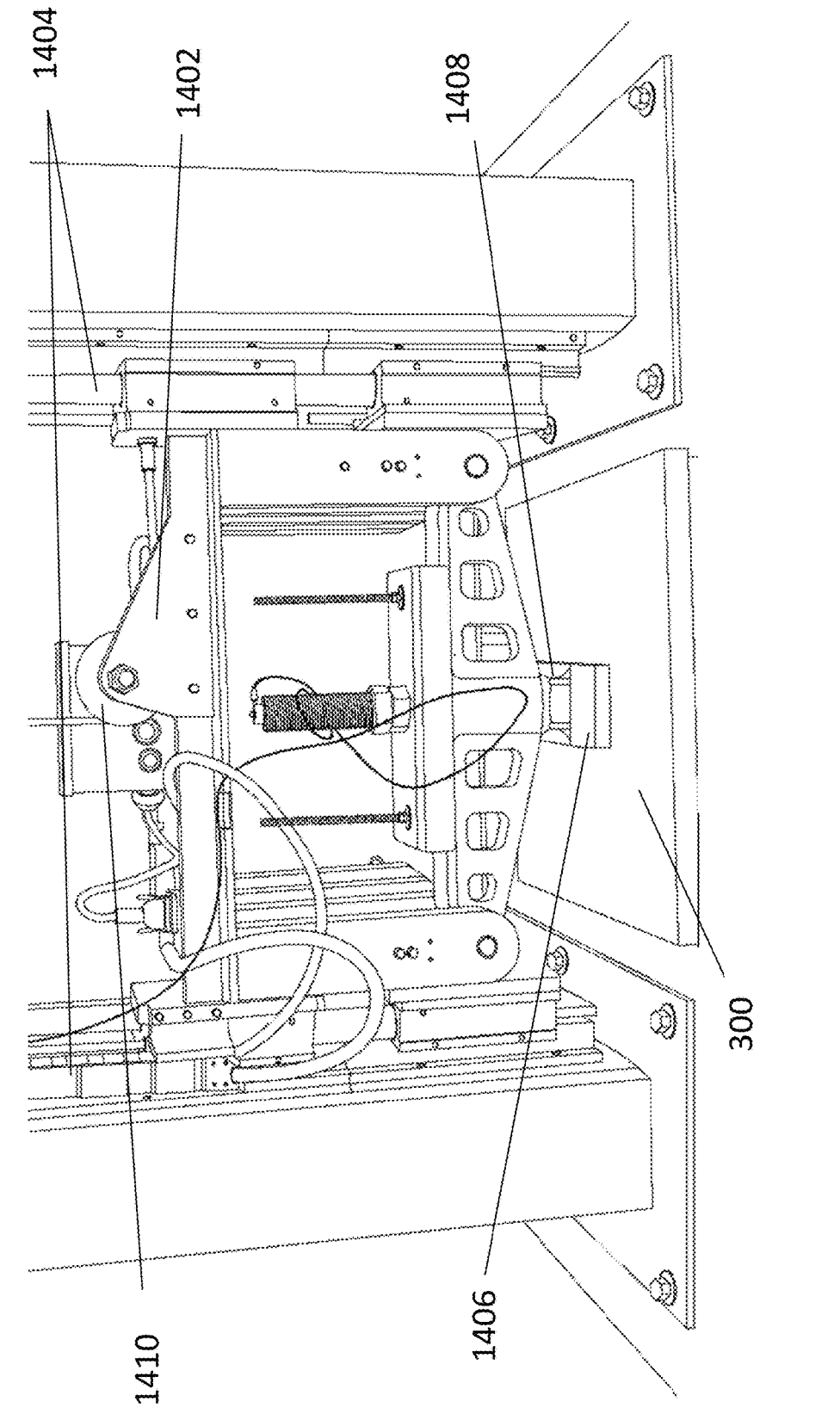
FIG. 14 is a front view of a test apparatus, in accordance with examples described herein.

FIG. 14 is a front view of a test apparatus 1400, in accordance with examples described herein. The test apparatus 1400 may be used to obtain mat profile or calibration data, such as force pulse data, for one or more mats 300. One or more of the mats 300 may be of the type described above with reference to FIG. 3. As shown, the test apparatus 1400 may include a carriage 1402 which moves along a track 1404. Such movement may be induced by gravitational forces when the movement is downward, and it may be induced by external forces when the movement is upward. In the illustrated example, the test apparatus 1400 includes one or more pulleys 1410 and/or cables which may be configured to aid in raising the carriage 1402.

As further shown, a mat 300 is positioned between the test apparatus 1400. The mat 300 may be impacted by an impact foot 1406 which is located at a lower end of the carriage 1402. As the carriage 1402 is dropped, it travels along the track 1404 and impacts the mat 300. A force gauge 1408 may be positioned along the impact foot 1406. The force gauge 1408 is positioned at a lower side of the impact foot 1406 so that the force gauge 1408 contacts the mat 300. In this way, the force gauge 1408 is positioned to measure the force pulse of the mat 300.

A weight may be added to or positioned upon the carriage 1402 so that the test apparatus 1400 may be configured to obtain the force pulse of the mat 300 upon impact by a particular weight. The height from which the carriage 1402 is released may also be configurable. The drop height may be configured with a pin or other restraining device which may attach to the carriage 1402 and hold it at a particular height until released. In another example, the pin or other restraining device may be attached to the carriage 1402 indirectly. For example, the pin or other restraining device may be attached to or otherwise engage a cable that is attached to the carriage 1402. The pin or other restraining device may hold the carriage 1402 at a desired height and the pin or other restraining device may be removed to allow the carriage 1402 to be dropped to impact the mat 300. The weight may be configured such that it is equivalent to the weight of the mass 108 (FIG. 2A). The height may be configured to be equivalent to the desired height as described with reference to FIG. 5.

The force gauge 1408 may be a force sensor. For example, the force gauge 1408 may be a piezo electric force sensor. By way of example, the force gauge 1408 may be an Integrated Electronics Piezo Electric force gauge 1408.

The force gauge 1408 may be in communication with a processor which processes the force pulse data generated by the force gauge 1408. The processor may be a module of a second computing device. The second computing device may be a separate device to the test apparatus 1400 and/or may be an on-board component associated with the test apparatus 1400. The processor may include a plurality of processors.

Figure 15:
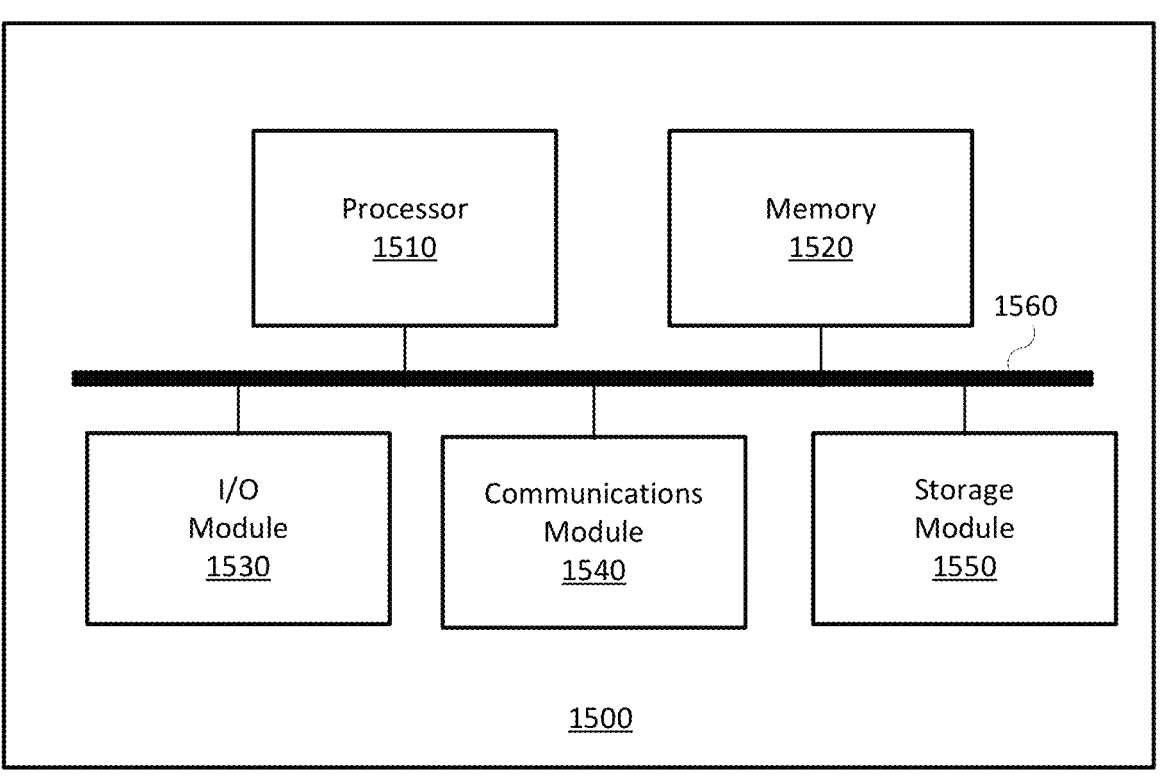
FIG. 15 is a high-level schematic diagram of a second computing device, in accordance with examples described herein.

Reference is now made to FIG. 15, which is a high-level schematic diagram of a second computing device 1500, in accordance with example described herein. As noted, the second computing device 1500 may form part of the test apparatus 1400 (FIG. 14) or may be located remote from the test apparatus 1400 (FIG. 14). The second computing device 1500 may be in wired or wireless communication with the force gauge 1408 (FIG. 14). In some embodiments, the second computing device 1500 may be located in the cloud.

The second computing device 1500 is referred to herein using the modifier "second" in order to distinguish the second computing device 1500 from the first computing device 810 (FIG. 8). The use of the modifier "second" in connection with the second computing device 1500 does not denote inferiority with respect to the first computing device 810 (FIG. 8). In some implementations, the first computing device 810 (FIG. 8) and the second computing device 1500 may be the same.

The second computing device 1500 includes a variety of modules. For example, as illustrated, the second computing device 1500 may include a processor 1510, a memory 1520, a communications module 1540, an I/O module 1530, and/or a storage module 1550. As illustrated, the foregoing example modules of the second computing device 1500 are in communication over a bus 1560.

The processor 1510 is a hardware processor. in some implementations, the second computing device 1500 may include a plurality of processors 1510. The processor 1510 may, for example, be one or more ARM, Intel x86, PowerPC processors or the like.

The memory 1520 allows data to be stored and retrieved. The second computing device 1500 may include a plurality of memories 1520. The memory 1520 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the second computing device 1500.

The I/O module 1530 is an input module and an output module. As an input module, the I/O module 1530 allows the second computing device 1500 to receive input from components of the second computing device 1500. As an output module, the I/O module 1530 allows the second computing device 1500 to provide output to components of the second computing device 1500.

The communications module 1540 allows the second computing device 1500 to communicate with other computing devices and/or various communications networks. The communications module 1540 may allow the second computing device 1500 to send or receive communications signals. Communications signals may be sent or received according to one or more protocols or according to one or more standards. For example, the communications module 1540 may allow the second computing device 1500 to communicate via a cellular data network, such as, for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 1040 may allow the first computing device 810 to communicate using near-field communication (NFC), via Wi-Fi™, using Bluetooth™ or via some combination of one or more networks or protocols. In some embodiments, all or a portion of the communications module 1540 may be integrated into a component of the second computing device 1500. For example, the communications module 1540 may be integrated into a communications chipset.

The storage module 1550 allows data to be stored and retrieved. In some embodiments, the storage module 1550 may be formed as a part of the memory 1520 and/or may be used to access all or a portion of the memory 1520. Additionally or alternatively, the storage module 1550 may be used to store and retrieve data from persisted storage other than the persisted storage (if any) accessible via the memory 1520. In some embodiments, the storage module 1550 may be used to store and retrieve data in/from a database. A database may be stored in persisted storage. Additionally or alternatively, the storage module 1550 may access data stored remotely such as, for example, as may be accessed using a local area network (LAN), wide area network (WAN), personal area network (PAN), and/or a storage area network (SAN). In some embodiments, the storage module 1550 may access data stored remotely using the communications module 1540. In some embodiments, the storage module 1550 may be omitted and its function may be performed by the memory 1520 and/or by the processor 1510 in concert with the communications module 1540 such as, for example, if data is stored remotely.

The processor 1510 of the second computing device 1500 may obtain a force pulse signature from the force pulse data obtained by the force gauge 1408 (FIG. 14). The force pulse signature may be a time domain force pulse signature, i.e., a representation of the force measurement at the force gauge over time. Alternatively, the force pulse signature may be a frequency domain force pulse signature.

Figure 16:
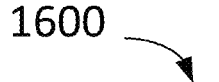
FIG. 16 is a line graph showing two example frequency domain force pulse signatures, in accordance with examples described herein.

FIG. 16 is a line graph 1600 showing two example frequency domain force pulse signatures 1602, 1604. As shown, the x-axis of the line graph 1600 is labeled "⅓ Octave Band (Hz)" and the y-axis is labeled "Fast Max SPL (dB re μPa)".

The first force pulse signature 1602 is associated with a first mat and the second force pulse signature 1604 is associated with a second mat. The first mat and the second mat are of different thicknesses. The first mat is a 30 mm mat and the second mat is a 70 mm mat.

The force pulse signatures 1602, 1604 of the line graph 1600 were obtained using the test apparatus 1400 (FIG. 14) with first and second mats. With reference to FIG. 14, for each of the first and second mats, the carriage 1402 of the test apparatus 1400 was dropped from a common height (50 cm) above each mat 300. The weight of the carriage was a common weight (22.7 kg) in both instances.

Returning again to FIG. 15, the processor 1510 may be connected to a memory 1520 and/or a storage module 1550 and the memory 1520 and/or the storage module 1550 may store the force data generated by the force gauge 1408 and/or data derived therefrom. For example, in at least some implementations, the processor 1510 may cause the memory 1520 to store profile or calibration data, such as force pulse data. By way of example, the processor 1510 may cause the memory 1520 to store one or more force pulse signatures. The one or more force pulse signatures may be, for example, one or more time domain force pulse signatures and/or one or more frequency domain force pulse signatures. In at least some implementations, one or more force pulse signatures or other profile, calibration or force pulse data may be stored in association with one or more mat identifiers. A mat identifier may identify the particular type of acoustic insulation apparatus represented by the associated mat. The mat identifier may be or include a mat type identifier, a mat serial number or other unique sample identifier, or both. The mat type identifier may identify or be associated with a mat thickness.

For example, with reference again to FIG. 16, the first force pulse signature 1602 may be stored in association with a mat identifier indicating that the associated first mat is a 30 mm mat and the second force pulse signature 1604 may be stored in association with a mat identifier indicating that the associated second mat is a 70 mm mat. The mat identifier that identifies a type of mat may be or include a product identifier. By way of example, the first force pulse signature 1602 may be stored in association with a mat identifier indicating that the associated first mat is a Pliteq GenieMat FIT30 mat and the second force pulse signature 1604 may be stored in association with a mat identifier indicating that the associated second mat is a Pliteq GenieMat FIT70 mat. A mat identifier may include both a product identifier and a mat thickness. For example, the first force pulse signature 1602 may be stored in association with a mat identifier indicating that the associated first mat is a Pliteq GenieMat FIT30 mat having a thickness of 30 mm and the second force pulse signature 1604 may be stored in association with a mat identifier indicating that the associated second mat is a Pliteq GenieMat FIT70 mat having a thickness of 70 mm.

Using the test apparatus 1400 (FIG. 14), one or more isolation acoustic measurements, such as profile, calibration or force response data, such as force pulse signatures 1602, 1604 may be obtained in connection with each unique mat that is included in and used with each kit 350 (FIG. 4) of the type described above. For example, with reference to FIG. 4, each kit 350 may include one and only one mat 300 and the mat 300 that is associated with a kit 350 may have an associated unique mat identifier such as a unique serial number. The mat 300 that is included with a particular kit 350 may be described as the reference mat 300 with respect to the particular kit 350. The mat identifier or a representation of the mat identifier may be printed or otherwise applied to each reference mat 300. For example, a machine-readable code such as a quick response (QR) code may be applied to each reference mat 300. The machine-readable code may encode the mat identifier such that that the mat identifier may be obtained from the machine-readable code by scanning the machine-readable code with a camera associated with a computing device, such as a camera that may be a component of the first computing device (FIG. 10). In this way, one or more isolation acoustic measurements associated with a reference mat 300, such as one or more force pulse signatures associated with a reference mat 300, may be obtained by scanning a machine-readable code applied to the reference mat 300.

Using the test apparatus 1400 (FIG. 14), isolation acoustic measurements, such as profile, calibration or force response data, such as force pulse signatures, may be obtained for mats of various types (compositions and/or thicknesses) of acoustic insulation apparatuses. The mats may be shock-absorbing mats and/or acoustic insulating mats. For example, one or more force pulse signatures may be obtained in connection with a plurality of secondary acoustic isolation apparatuses. A plurality of secondary isolation acoustic measurements may be determined using the test apparatus 1400 (FIG. 14). Each of the plurality of secondary isolation acoustic measurements may corresponding to a distinct secondary type of acoustic insulation apparatus. The force pulse signatures may be obtained in a time domain reflecting the force pulse data vs time. With reference to FIG. 15, the processor 1510 may, in at least some implementations, convert the time domain force pulse signatures into frequency domain force pulse signatures. The processor may do so by performing a Fourier transform. For example, the processor may perform a fast Fourier transform (FFT) on the time domain data, such as the time domain force pulse signatures, in order to obtain frequency domain data, such as the frequency domain force pulse signatures. The memory 1520 and/or the storage module 1550 may store time domain force data, frequency domain force data, or both. For example, the memory 1520 and/or the storage module 1550 may store time domain force pulse signatures, frequency domain force pulse signatures, or both. As will be described in greater detail below, this data may be used to predict on-site acoustic measurements of a number of different types of mats based on measurements obtained on-site using only a single type of mat.

Returning again to FIG. 4, a mat 300 that is associated with a particular kit 350 may be described as the reference mat 300 with respect to the particular kit 350. For each reference mat 300, a plurality of difference measurements may be determined. The plurality of difference measurements may be stored in the memory 1520 (FIG. 15) and/or the storage module 1550 (FIG. 15) of the second computing device (FIG. 15). Each of the plurality of difference measurements may be associated with a distinct secondary type of acoustic insulation apparatus.

In some embodiments, determining the plurality of difference measurements may comprise comparing the isolation acoustic measurement for the reference mat 300 to each of the plurality of secondary isolation acoustic measurements.

After a mat 300 has been calibrated by obtaining one or more force pulse signatures for the mat using the test apparatus 1400, the mat may be used for testing at a particular site. For example, as noted, the mat 300 may be used with the kit 350 at a particular site.

For example, the method 500 of FIG. 5 or a variation thereof may be employed with the mat 300 at a particular site. By way of example, and with reference now made to FIG. 6, acoustic measurement instrumentation 620 such as a sound level meter, may be placed at a particular location within a structure at a particular site. The particular location may be a location where sound is to be isolated.

The acoustic measurement instrumentation 620 may be, for example, a sound level meter, sometimes referred to as a sound pressure level (SPL) meter, decibel (dB) meter, noise meter or noise dosimeter. Additionally or alternatively, the acoustic measurement instrumentation 620 may be or may include a vibration meter placed beneath the surface 410. In some embodiments, the acoustic instrumentation may be hand-held and may be provided by one or more auxiliary users. The sound level meter may include a microphone or other sensor. The sound level meter may be an octave band sound level meter.

The mat 300 may be placed on the floor of a surface 410 that is being evaluated for an acoustic treatment to prevent sound from being transmitted to the particular location where sound is to be isolated. The particular location is, in some instances, below the surface 410. For example, in some instances, the particular location is immediately below the surface 410; for example, at a next lowest floor. In some instances, the particular location is above the surface 410. For example, in some instances, the particular location is immediately above the surface 410; for example, at a next highest floor.

In some embodiments, prior to placing the mat 300, any existing flooring may be removed from the surface 410 so that the mat 300 may be placed directly upon the surface 410, which may be, for example, a slab.

As described above with reference to step 506 of FIG. 5, a tube 102 (FIG. 1) may be vertically positioned upon the mat 300. In other words, the tube 102 may be positioned such that a length of the tube is perpendicular to the surface. In some embodiments, the tube 102 may be vertically positioned in the centre of the mat 300. The tube 102 may be placed such that it is freestanding, i.e., the tube 102 may be placed in such a way that the length of the tube remains perpendicular to the surface 410 without additional structural support. Alternatively, the tube 102 may be supported in a vertical position, for example, by supporting means such as the hand of the user.

As described above with reference to step 508 of the method 500 of FIG. 5, the user 610 may position an elongated pin 106 (FIG. 1) through a first pair of diametrically opposing holes 104. In embodiments where the tube 102 has multiple pairs of diametrically opposing holes 104 provided at varying heights, the user 610 may select the pair of diametrically opposing holes 104 corresponding to a desired height. As previously described, in some embodiments, the tube 102 may not have any pairs of diametrically opposing holes 104, and/or the user 610 of the apparatus 100 may wish to avoid the use of the elongated pin 106. In some such embodiments, step 508 may be omitted.

As described above with reference to step 510 of the method 500, a mass 108 (FIG. 1) may be positioned within the tube 102 such that the mass 108 rests upon the elongated pin 106. In some embodiments, after positioning the mass 108, depending on the position of the elongated pin 106, some or all of the mass 108 may extend beyond the first open end 110 of the tube 102, as shown in the examples of FIGS. 1A, 2A, 2B, 4 and 7. As previously described, in some embodiments, the tube 102 may not have any pairs of diametrically opposing holes 104 and/or the user 610 may wish to avoid the use of the elongated pin 106. In some such embodiments, instead of positioning the mass 108 such that it rests upon the elongated pin 106, the mass 108 may be suspended at or near the first open end 110 of the tube 102. For example, the mass 108 may be held by hand at or near the first open end 110 of the tube 102.

As described above with reference to step 512 of the method 500, the elongated pin 106 (FIG. 1) may be removed from the tube 102 such that the mass 108 falls through a bottom portion of the tube 102 onto the surface 410 and, more particularly, onto the mat 300.

In other words, the elongated pin 106 may be removed from the tube 102 such that the mass 108 falls through the second open end 112 of the tube 102 onto the surface 410. In this way, the mass 108 may apply a first force to the mat 300. As a result, a second force may be transferred by the mat 300 to the surface 410 beneath the mat 300. In turn, a third force may be transferred by the surface 410 to the environment below the surface 410. The magnitude of the third force may depend, in one aspect, upon the acoustic properties of the surface 410. The third force, and/or an effect thereof, may subsequently be measured by the acoustic measurement instrumentation 620.

As described above with reference to step 514, a first resulting output may be obtained. The first resulting output may be provided by the acoustic measurement instrumentation 620. The first resulting output may be an acoustic measurement obtained in the ⅓ octave band. The first resulting output may be force pulse data. The first resulting output may be obtained a high rate. For example, the first resulting output may be obtained at a 25 millisecond interval, in at least some implementations.

The first resulting output may be obtained electronically by one or more computing devices such as one or more computing system, such as the first computing device 810 (FIG. 8). That is, one or more computing devices may obtain and store the first resulting output from the acoustic measurement instrumentation 620.

Figure 7:
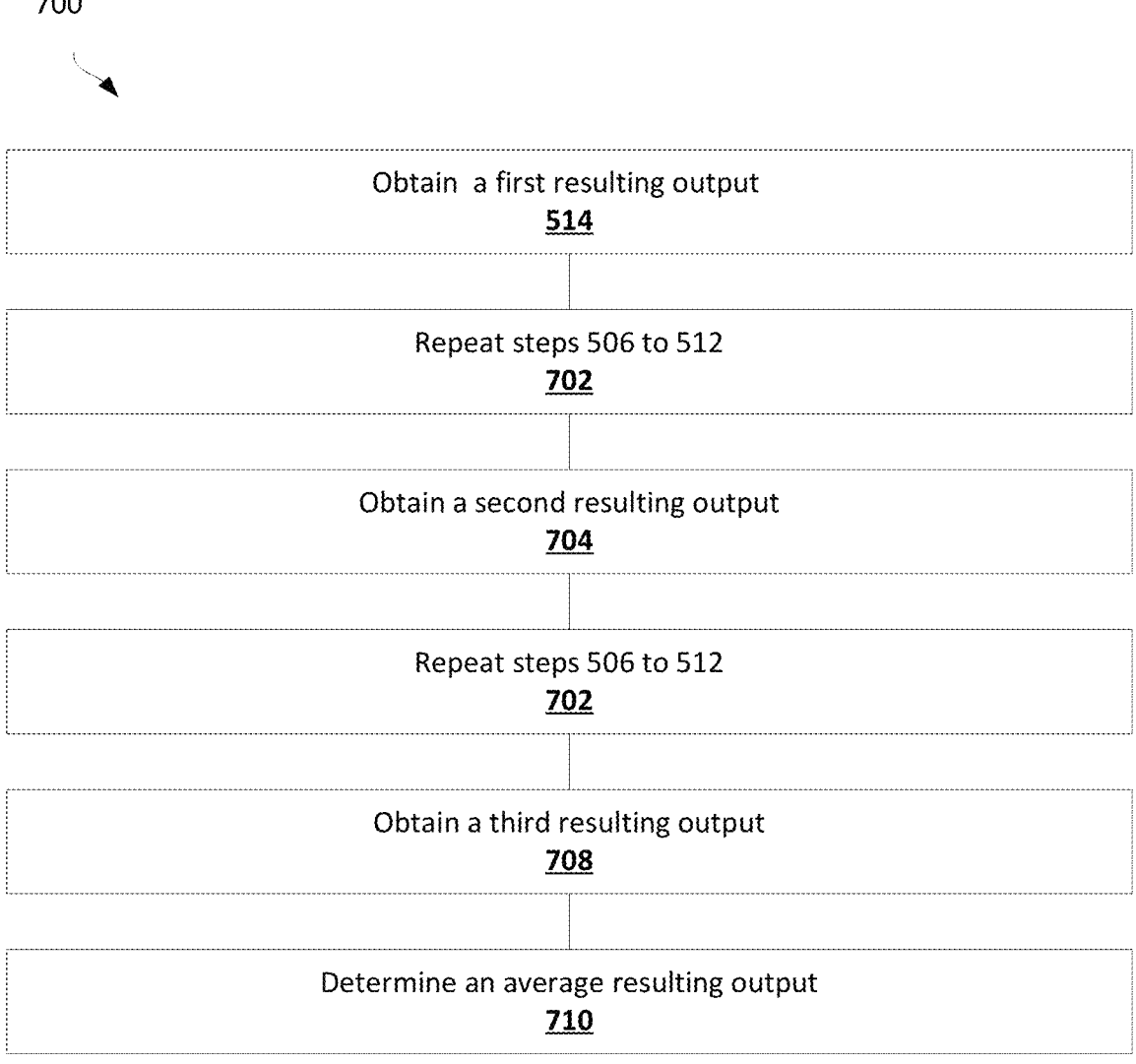
FIG. 7 is a flowchart of a method of determining an average resulting output, in accordance with an embodiment of the present application.

In some implementations, the measurement may be repeated, as described in the method 700 of FIG. 7 and an average resulting output obtained.

The acoustic measurement instrumentation 620 may also be used to obtain an on-site ambient noise measurement. The on-site ambient noise measurement may comprise ambient or background noise sound level data. The on-site ambient noise measurement may be obtained when the mass 108 (FIG. 1) is not impacting the mat and when there is no effect of such impact in the obtained data. The on-site ambient noise measurement reflects the sound level of the ambient or background noise only. The on-site ambient noise measurement may be an acoustic measurement obtained in the ⅓ octave band. The on-site ambient noise measurement may be obtained electronically by one or more computing devices such as one or more computing systems. That is, one or more computing devices may obtain and store the on-site ambient noise measurement received from the acoustic measurement instrumentation 620.

In some implementations, the on-site ambient noise measurement may be repeated, similar to the method 700 of FIG. 7, and an average on-site ambient noise measurement may be obtained.

Reference is now made to FIG. 17, which is a flowchart depicting example operations performed in a computer-implemented method 1700 of selecting a preferred type of acoustic insulation apparatus in connection with a particular site. Operations starting with an operation 1702 and continuing onward are performed by the processor 1010 (FIG. 10) of a computing system, such as the first computing device 810 (FIG. 8) executing software comprising instructions such as may be stored in the memory 1020 of the first computing device 810.

At the operation 1702, the system determines an isolation measurement corresponding to a reference type of acoustic insulation apparatus.

As previously noted with reference to FIG. 4, a mat 300 may comprise a particular type of acoustic insulation apparatus, and the mat 300 that is included with a particular kit 350 may be described as the reference mat 300 with respect to the particular kit 350. As further noted, a mat identifier or a representation of the mat identifier may be printed or otherwise applied to a reference mat 300. In some embodiments, the system may use the mat identifier to determine an isolation acoustic measurement corresponding to the reference type of acoustic insulation apparatus represented by the reference mat 300.

For example, in some embodiments, a machine-readable code such as a quick response (QR) code may be applied to the reference mat 300. In such examples, the machine-readable code may encode the mat identifier such that the mat identifier may be obtained from the machine-readable code by scanning the machine-readable code with a camera associated with the system. In this way, an isolation acoustic measurement corresponding to the reference type of acoustic insulation apparatus may be determined by the computing system.

In some implementations, the isolation acoustic measurement may be a force pulse signature, such as a time domain force pulse signature or a frequency domain force pulse signature.

At the operation 1704, the system determines a plurality of difference measurements. Each of the plurality of difference measurements is associated with a distinct secondary type of acoustic insulation apparatus. Each difference measurement may be the difference or delta between the force pulse signature obtained for the reference mat in isolation (i.e., the isolation acoustic measurement) using the test apparatus 1400 (FIG. 14) and the force pulse signature obtained for the corresponding secondary mat in isolation (i.e., the secondary isolation acoustic measurement) using the test apparatus 1400.

In some embodiments, the system may determine the plurality of difference measurements in the same manner as the system determines the isolation acoustic measurement. For example, in some embodiments, the system may use the mat identifier of the reference mat to determine both the isolation acoustic measurement and the plurality of difference measurements.

In some embodiments, however, the system may determine the plurality of difference measurements by first determining a plurality of secondary isolation acoustic measurements and by then comparing the isolation acoustic measurement to each of the plurality of secondary isolation acoustic measurements. In such embodiments, the plurality of secondary isolation acoustic measurements may be obtained in the same manner as the system determines the isolation acoustic measurement. For example, in some embodiments, the system may use the mat identifier of the reference mat to determine both the isolation acoustic measurement and the secondary isolation acoustic measurements.

At the operation 1706, the system receives an on-site acoustic measurement corresponding to the reference type of acoustic insulation apparatus. The on-site acoustic measurement may be obtained using the reference mat at the particular site. The on-site acoustic measurement may be an acoustic measurement obtained in the ⅓ octave band.

In some embodiments, the on-site acoustic measurement may be force response data, such as one or more time domain and/or frequency domain force pulse signatures. In some embodiments, the on-site acoustic measurement may be or may be based upon a first resulting output, such as described above with reference to the method 500 of FIG. 5. In some embodiments, the on-site acoustic measurement may be or may be based upon an average resulting output, such as described above with reference to the method 700 of FIG. 7. In some embodiments, the on-site acoustic measurement may be one or more time domain and/or frequency domain force pulse signatures based upon the first resulting output of FIG. 5 and/or the average resulting output of FIG. 7.

At the operation 1708, the system determines a predicted secondary on-site acoustic measurement for each distinct secondary type of acoustic insulation apparatus. For each distinct secondary type of acoustic insulation apparatus, the predicted secondary on-site acoustic measurement may be determined by adjusting the on-site acoustic measurement by the difference measurement associated with the distinct secondary type of acoustic insulation apparatus.

At the operation 1710, the system receives an on-site ambient noise measurement. In some embodiments, the system may receive the on-site ambient noise measurement from the acoustic measurement instrumentation 620 (FIG. 8) at the particular site, or from one or more computing devices storing the on-site ambient noise measurement received from the acoustic measurement instrumentation 620.

As previous noted, the on-site ambient noise measurement may comprise ambient or background noise sound level data. The on-site ambient noise measurement may be obtained when the mass 108 (FIG. 1) is not impacting the mat and when there is no effect of such impact in the obtained data. The on-site ambient noise measurement reflects the sound level of the ambient or background noise only. The on-site ambient noise measurement may be an acoustic measurement obtained in the ⅓ octave band.

At the operation 1712, the system determines the on-site acoustic measurement having the closest value to the on-site ambient noise measurement.

At the operation 1714, the system selects, as the preferred type of acoustic insulation apparatus in connection with the particular site, the type of acoustic insulation apparatus being associated with the on-site acoustic measurement having the closest value to the on-site ambient noise measurement. In this way, the mat having the on-site acoustic measurement (whether directly measured or predicted) having the closest value to the on-site ambient noise measurement may be selected as the best or preferred mat. The type of acoustic insulation apparatus being associated with the preferred mat may be selected as the preferred type of acoustic insulation apparatus.

Notably, with reference to the method 1700, the testing that is performed on site may be performed with only a single mat, which may be referred to as a reference mat. This is in contrast to traditional testing systems which typically require each possible mat to be independently tested on site. Instead, a computing system may predict the performance of various secondary mats at the site based on the data obtained from the test apparatus 1400 (FIG. 14) as described above and based on the data obtained on-site using the reference mat. The test apparatus 1400 provides data representing the force response of the secondary mats alone, i.e., in isolation, without the effect of the structure and this allows the computing system to predict the performance of other mats based on site data obtained using only a single mat. In order to determine the performance of a secondary mat that was not tested on-site, the computing system may adjust the resulting output or average resulting output obtained onsite (i.e., the on-site acoustic measurement) using a reference mat, by a difference measurement. The difference measurement may be the difference or delta between the force pulse signature obtained for the reference mat in isolation (i.e., the isolation acoustic measurement) using the test apparatus 1400 (FIG. 14) and the force pulse signature obtained for the secondary mat in isolation (i.e., the secondary isolation acoustic measurement) using the test apparatus 1400. The adjusted output may be referred to as a predicted output or as a predicted secondary on-site acoustic measurement. This procedure may be repeated for additional secondary mats of a variety of types (including a variety of compositions and thicknesses) so that the on-site performance of a variety of types of mats may be predicted even though only a single reference mat was used onsite for testing. This procedure may include, for each distinct secondary type of acoustic insulation apparatus, determining a predicted secondary on-site acoustic measurement by adjusting the on-site acoustic measurement by the difference measurement associated with the distinct secondary type of acoustic insulation apparatus. This procedure may simplify testing since technicians do not need to test each and every mat on site.

The system may then select one or more mats as a preferred type by comparing the on-site acoustic measurement of the reference mat and/or the predicted secondary on-site acoustic measurement of the secondary mats to the on-site ambient noise measurement. The mat having the on-site acoustic measurement (whether directly measured or predicted) having the closest value to the on-site ambient noise measurement may be selected as the best or preferred mat. The type of acoustic insulation apparatus being associated with the preferred mat may be selected as the preferred type of acoustic insulation apparatus.

Subsequent to the execution of the method 1700, the system may identify the preferred type of acoustic insulation apparatus to a user in a number of ways. For example, the system may provide user interface data causing a display of a user interface that includes an identification of one or more preferred types of acoustic insulation apparatuses, as described with respect to FIG. 13. Additionally or alternatively, the system may provide user interface data to a client device, the user interface data causing the client device to display or otherwise output such a user interface.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

I claim:

1. A computer system for selecting a preferred type of acoustic insulation apparatus in connection with a particular site, the computer system comprising:

a processor; and a memory coupled to the processor and storing instructions which, when executed by the processor, cause the computer system to:

determine an isolation acoustic measurement corresponding to a reference type of acoustic insulation apparatus;

determine a plurality of difference measurements, each of the plurality of difference measurements being associated with a distinct secondary type of acoustic insulation apparatus;

receive an on-site acoustic measurement corresponding to the reference type of acoustic insulation apparatus;

for each distinct secondary type of acoustic insulation apparatus:

determine a predicted secondary on-site acoustic measurement by adjusting the on-site acoustic measurement by the difference measurement associated with the distinct secondary type of acoustic insulation apparatus;

receive an on-site ambient noise measurement;

determine the on-site acoustic measurement having the closest value to the on-site ambient noise measurement; and select, as the preferred type of acoustic insulation apparatus, a type of acoustic insulation apparatus being associated with the on-site acoustic measurement having the closest value to the on-site ambient noise measurement.

2. The computer system of claim 1, wherein the computer system is further caused to:

provide user interface data causing a display of a user interface that includes an identification of the preferred type of acoustic insulation apparatus.

3. The computer system of claim 1, wherein determining the plurality of difference measurements comprises:

determining a plurality of secondary isolation acoustic measurements, each of the plurality of secondary isolation acoustic measurements corresponding to one of the distinct secondary types of acoustic insulation apparatuses; and determining the plurality of difference measurements by comparing the isolation acoustic measurement to each of the plurality of secondary isolation acoustic measurements.

4. The computer system of claim 3, wherein the isolation acoustic measurement is a frequency domain force pulse signature, and wherein the frequency domain force pulse signature is determined by:

receiving force pulse data corresponding to the reference type of acoustic insulation apparatus in isolation;

obtaining a time domain force pulse signature using the force pulse data; and converting the time domain force pulse signature to a frequency domain force pulse signature.

5. The computer system of claim 4, wherein the force pulse data is obtained from a force gauge oriented to measure a force pulse of a mat upon impact by a mass.

6. The computer system of claim 3, wherein the secondary isolation acoustic measurements are frequency domain force pulse signatures, and wherein the frequency domain force pulse signatures are determined by:

receiving force pulse data corresponding to each of the distinct secondary types of acoustic insulation apparatuses in isolation;

obtaining time domain force pulse signatures using the force pulse data; and converting each of the time domain force pulse signature to a frequency domain force pulse signature.

7. The computer system of claim 3, wherein determining the plurality of secondary isolation acoustic measurements comprises retrieving, from the memory, the isolation acoustic measurement.

8. The computer system of claim 1, wherein determining the isolation acoustic measurement comprises:

receiving a mat identifier associated with a reference mat, the reference mat comprising the reference type of acoustic insulation apparatus;

associating the mat identifier with a first stored acoustic measurement; and determining the isolation acoustic measurement to be the first stored acoustic measurement.

9. The computer system of claim 8, wherein the on-site acoustic measurement corresponding to the reference type of acoustic insulation apparatus has been obtained using the reference mat at the particular site.

10. The computer system of claim 1, wherein determining the isolation acoustic measurement corresponding to the reference type of acoustic insulation apparatus comprises retrieving, from the memory, the isolation acoustic measurement.

11. A computer-implemented method for selecting a preferred type of acoustic insulation apparatus in connection with a particular site, the method comprising:

determining an isolation acoustic measurement corresponding to a reference type of acoustic insulation apparatus;

determining a plurality of difference measurements, each of the plurality of difference measurements being associated with a distinct secondary type of acoustic insulation apparatus;

receiving an on-site acoustic measurement corresponding to the reference type of acoustic insulation apparatus;

for each distinct secondary type of acoustic insulation apparatus:

determining a predicted secondary on-site acoustic measurement by adjusting the on-site acoustic measurement by the difference measurement associated with the distinct secondary type of acoustic insulation apparatus;

receiving an on-site ambient noise measurement;

determining the on-site acoustic measurement having the closest value to the on-site ambient noise measurement; and selecting, as the preferred type of acoustic insulation apparatus, a type of acoustic insulation apparatus being associated with the on-site acoustic measurement having the closest value to the on-site ambient noise measurement.

12. The method of claim 11, further comprising:

providing user interface data causing a display of a user interface that includes an identification of the preferred type of acoustic insulation apparatus.

13. The method of claim 11, wherein determining the plurality of difference measurements comprises:

receiving a plurality of secondary isolation acoustic measurements, each of the plurality of secondary isolation acoustic measurements corresponding to one of the distinct secondary types of acoustic insulation apparatuses; and determining the plurality of difference measurements by comparing the isolation acoustic measurement to each of the plurality of secondary isolation acoustic measurements.

14. The method of claim 13, wherein the isolation acoustic measurement is a frequency domain force pulse signature, and wherein the frequency domain force pulse signature is determined by:

receiving force pulse data corresponding to the reference type of acoustic insulation apparatus in isolation;

obtaining a time domain force pulse signature using the force pulse data; and converting the time domain force pulse signature to a frequency domain force pulse signature.

15. The method of claim 14, wherein the force pulse data is obtained from a force gauge oriented to measure a force pulse of a mat upon impact by a mass.

16. The method of claim 13, wherein the secondary isolation acoustic measurements are frequency domain force pulse signatures, and wherein the frequency domain force pulse signatures are determined by:

receiving force pulse data corresponding to each of the distinct secondary types of acoustic insulation apparatuses in isolation;

obtaining time domain force pulse signatures using the force pulse data; and converting each of the time domain force pulse signature to a frequency domain force pulse signature.

17. The method of claim 11, wherein determining the isolation acoustic measurement comprises:

receiving a mat identifier associated with a reference mat;

associating the mat identifier with a first stored acoustic measurement; and determining the isolation acoustic measurement to be the first stored acoustic measurement.

18. The method of claim 17, wherein the on-site acoustic measurement corresponding to the reference type of acoustic insulation apparatus been obtained using the reference mat in the particular site.

19. The method of claim 11, wherein determining the isolation acoustic measurement corresponding to the reference type of acoustic insulation apparatus comprises retrieving, from a memory, the isolation acoustic measurement.

20. A non-transitory computer-readable storage medium containing instructions which, when executed by a processor, cause the processor to:

determine an isolation acoustic measurement corresponding to a reference type of acoustic insulation apparatus;

determine a plurality of difference measurements, each of the plurality of difference measurements being associated with a distinct secondary type of acoustic insulation apparatus;

receive an on-site acoustic measurement corresponding to the reference type of acoustic insulation apparatus;

for each distinct secondary type of acoustic insulation apparatus:

determine a predicted secondary on-site acoustic measurement by adjusting the on-site acoustic measurement by the difference measurement associated with the distinct secondary type of acoustic insulation apparatus;

receive an on-site ambient noise measurement;

determine the predicted secondary on-site acoustic measurement having the closest value to the on-site ambient noise measurement; and select, as a preferred type of acoustic insulation apparatus, the distinct secondary type of acoustic insulation apparatus being associated with the predicted secondary on-site acoustic measurement having the closest value to the on-site ambient noise measurement.

* * * * *